(12) United States Patent
Toma et al.

(10) Patent No.: US 8,411,759 B2
(45) Date of Patent: *Apr. 2, 2013

(54) MULTIPLEXING APPARATUS AND DEMULTIPLEXING APPARATUS

(75) Inventors: Tadamasa Toma, Toyonaka (JP); Tomoyuki Okada, Nara (JP); Shinya Kadono, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 1050 days.

This patent is subject to a terminal disclaimer.

(21) Appl. No.: 12/406,361

(22) Filed: Mar. 18, 2009

(65) Prior Publication Data

US 2009/0180758 A1    Jul. 16, 2009

Related U.S. Application Data

(62) Division of application No. 10/591,242, filed as application No. PCT/JP2005/010453 on Jun. 1, 2005, now Pat. No. 7,526,031.

(30) Foreign Application Priority Data

Jun. 2, 2004   (JP) ................................. 2004-165030

(51) Int. Cl.
   *H04N 7/12*      (2006.01)
   *H04N 5/93*      (2006.01)
   *H04N 5/783*     (2006.01)
(52) U.S. Cl. ..................... 375/240.26; 386/357; 386/344
(58) Field of Classification Search ........... 375/240.01–240.29; 348/96–112; 370/389; 386/68, 69, 70, 357, 344
   See application file for complete search history.

(56) References Cited

U.S. PATENT DOCUMENTS

| | | | |
|---|---|---|---|
| 5,828,787 A | 10/1998 | Uehara | |
| 6,049,569 A | 4/2000 | Radha et al. | |
| 6,091,776 A | 7/2000 | Linzer | |
| 6,208,691 B1 | 3/2001 | Balakrishnan et al. | |
| 6,252,873 B1 * | 6/2001 | Vines | 370/389 |
| 6,356,178 B1 | 3/2002 | Isozaki | |
| 6,567,471 B1 | 5/2003 | Yoshinari | |
| 6,580,869 B1 | 6/2003 | Ando et al. | |
| 6,584,125 B1 | 6/2003 | Katto | |
| 6,621,979 B1 | 9/2003 | Eerenberg et al. | |
| 6,765,963 B2 * | 7/2004 | Karczewicz et al. | 375/240.03 |
| 7,139,316 B2 | 11/2006 | Yoshinari | |

(Continued)

FOREIGN PATENT DOCUMENTS

| | | |
|---|---|---|
| CN | 1224299 A | 7/1999 |
| CN | 1236522 A | 11/1999 |

(Continued)

OTHER PUBLICATIONS

International Search Report issued Sep. 14, 2005 in International Application No. PCT/JP2005/010453.

(Continued)

*Primary Examiner* — Gims Philippe
(74) *Attorney, Agent, or Firm* — Wenderoth, Lind & Ponack, L.L.P.

(57) ABSTRACT

The multiplexing apparatus which does not make a user who watches a moving picture feel uncomfortable, the moving picture including: (i) a coding unit (42) for generating one or more coded streams so that no gap occurs at the connection of predetermined two access units in a process of decoding, in sequence, the two access units in all of the access units included in the coded streams; and (ii) a multiplexing unit (18) for multiplexing, with other information, the coded streams generated in the coding unit (42).

7 Claims, 31 Drawing Sheets

U.S. PATENT DOCUMENTS

| | | | |
|---|---|---|---|
| 7,526,031 B2 | 4/2009 | Toma et al. | |
| 7,711,051 B2 | 5/2010 | Yoshinari | |
| 8,223,847 B2 | 7/2012 | Yoshinari | |
| 2002/0041628 A1 | 4/2002 | Andersson et al. | |
| 2002/0146239 A1 | 10/2002 | Hamasaka et al. | |
| 2003/0067989 A1 | 4/2003 | Yoshinari | |
| 2003/0206596 A1 | 11/2003 | Carver et al. | |
| 2004/0076402 A1 | 4/2004 | Jung et al. | |
| 2005/0117642 A1 | 6/2005 | Abe et al. | |
| 2007/0047661 A1 | 3/2007 | Yoshinari | |
| 2007/0047662 A1 | 3/2007 | Yoshinari | |
| 2007/0058729 A1 | 3/2007 | Yoshinari | |
| 2007/0110391 A1* | 5/2007 | MacInnis | 386/68 |
| 2007/0165715 A1 | 7/2007 | Yoshinari | |
| 2007/0171976 A1 | 7/2007 | Toma et al. | |
| 2010/0046638 A1 | 2/2010 | Toma et al. | |

FOREIGN PATENT DOCUMENTS

| | | |
|---|---|---|
| EP | 0 923 243 A1 | 6/1999 |
| JP | 09-027956 | 1/1997 |
| JP | 09-284771 | 10/1997 |
| JP | 11-196375 | 7/1999 |
| JP | 11-234675 | 8/1999 |
| JP | 2003-018549 | 1/2003 |
| JP | 2004-088736 | 3/2004 |
| JP | 2008-502170 | 1/2008 |
| WO | 96/33573 | 10/1996 |

OTHER PUBLICATIONS

W. O'Grady et al., "Real-Time switching of MPEG-2 bitstreams", Broadcasting Convention, 1997, IBS 97, International (Conf. Publ. 447) Amsterdam, Netherlands, Sep. 12-16, 1997, London, UK, IEE, UK, Sep. 12, 1997, pp. 166-170, XP006508751.

C. H. Birch, "MPEG splicing and bandwidth management," Broadcasting Convention, 1997, IBS 97, International (Conf. Publ. 447) Amsterdam, Netherlands, Sep. 12-16, 1997, London, UK, IEE, UK, Sep. 12, 1997, pp. 541-546, XP006508813.

Office Action issued May 12, 2010 in U.S. Appl. No. 12/572,538.

Notice of Allowance issued Dec. 4, 2012 in corresponding Chinese Application No. 200910150999.7 (with partial English translation).

Notice of Allowance issued Dec. 4, 2012 in corresponding Chinese Application No. 200910150998.2 (with partial English translation).

* cited by examiner

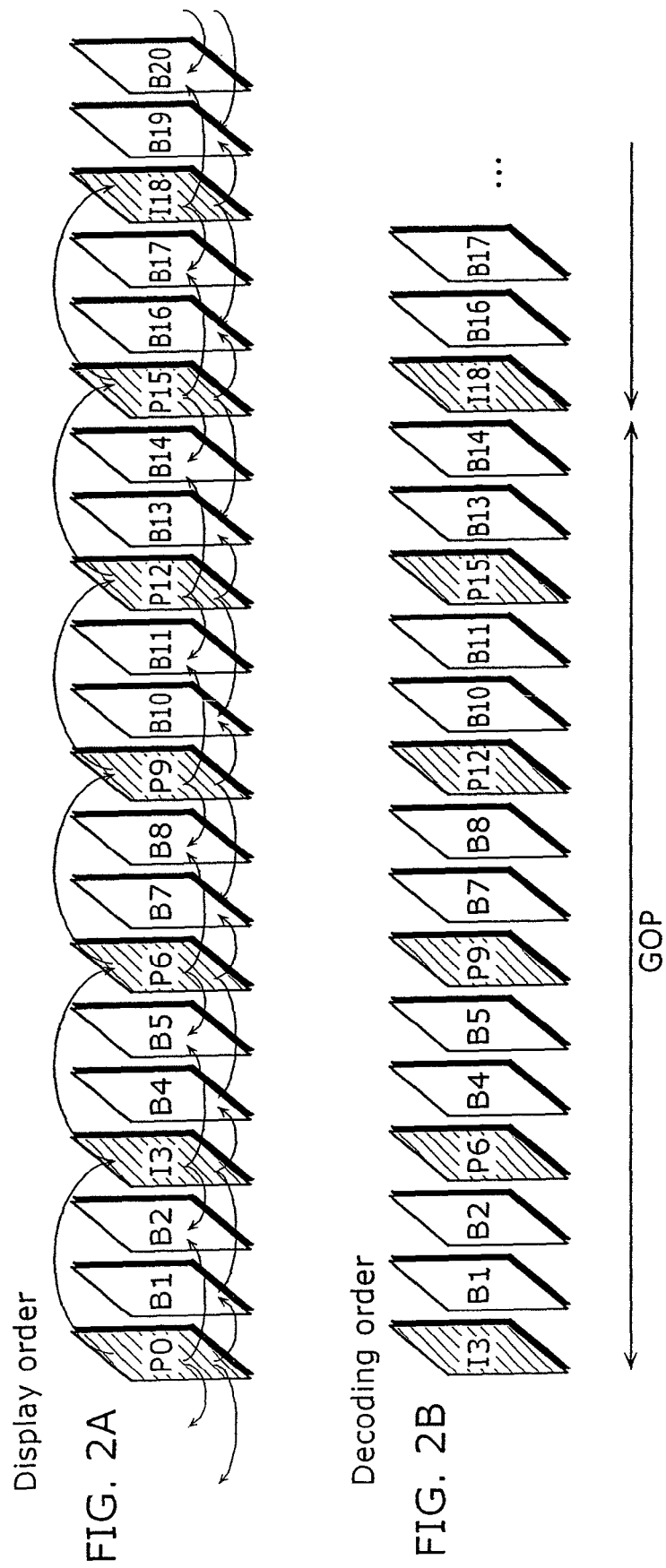
FIG. 2A Display order
FIG. 2B Decoding order

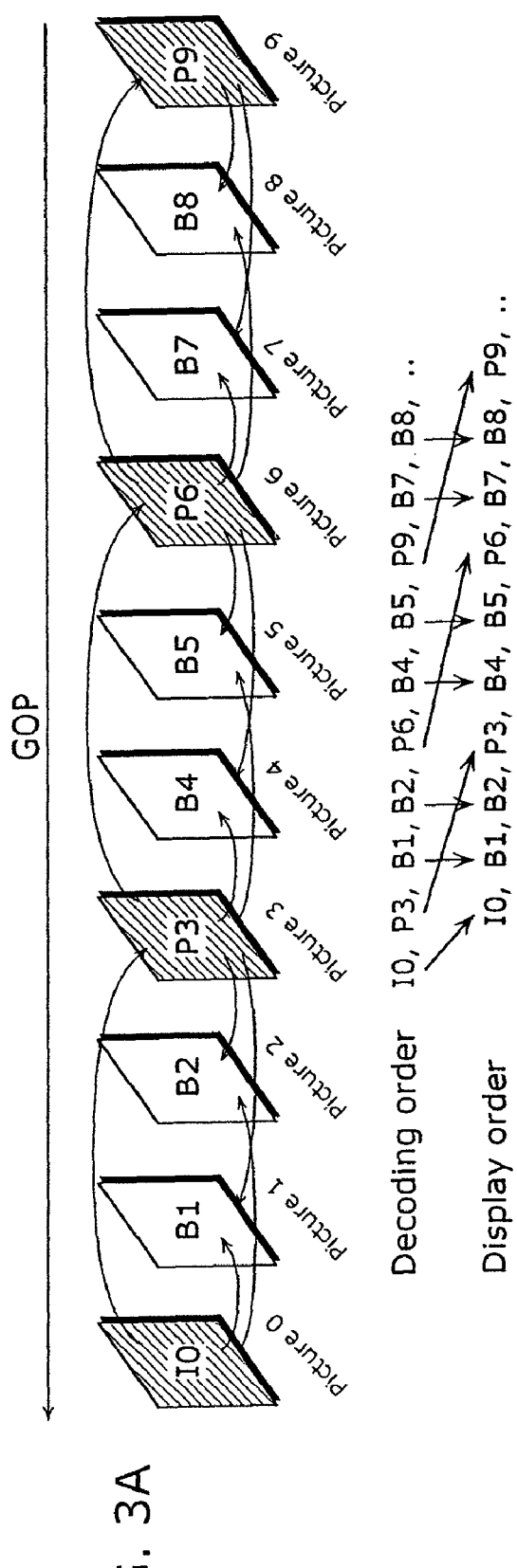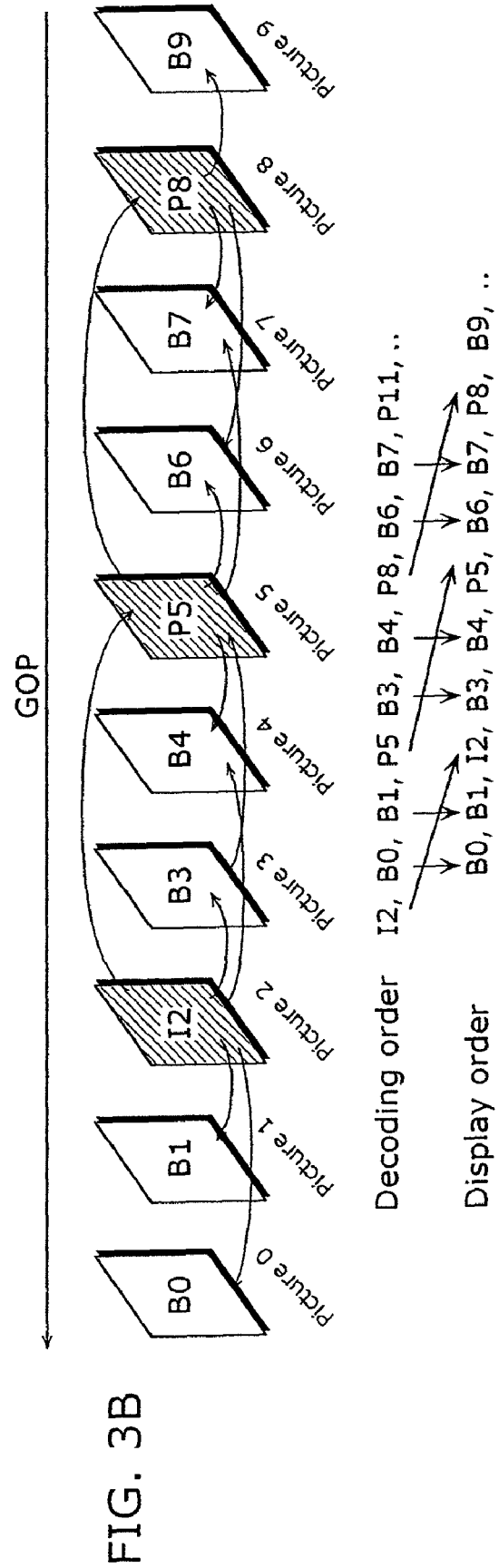
FIG. 3A
FIG. 3B

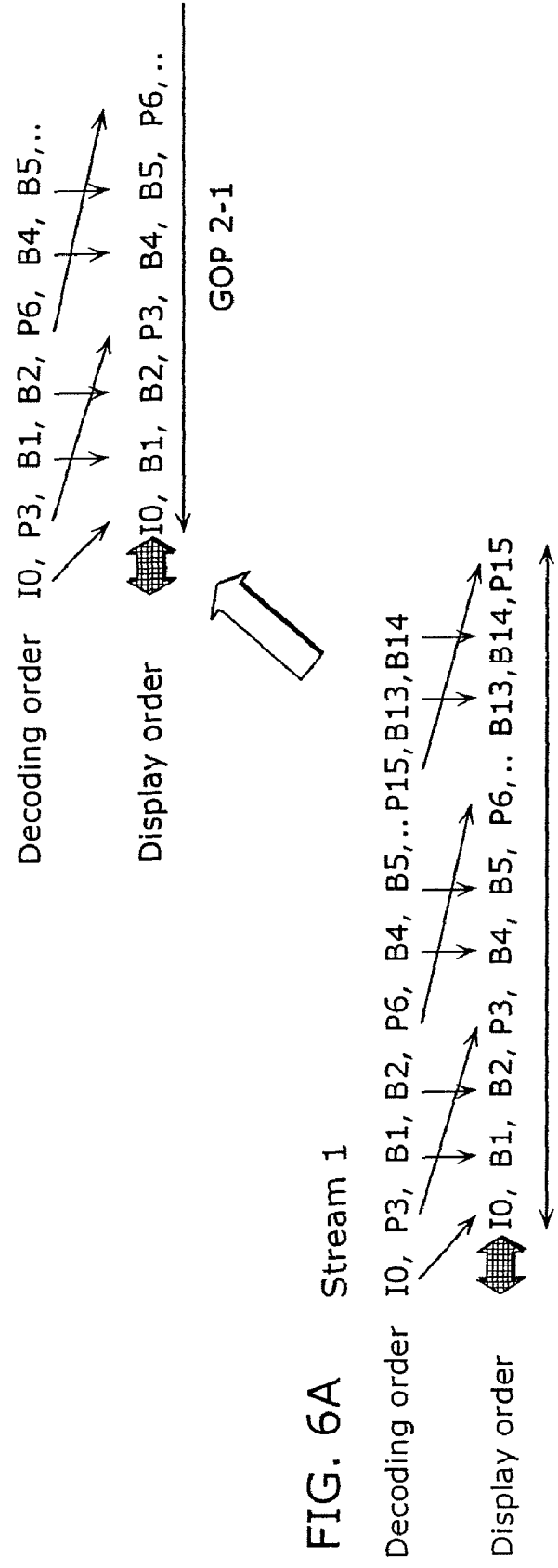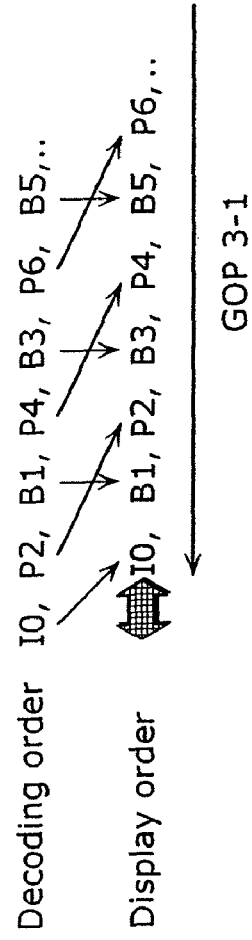

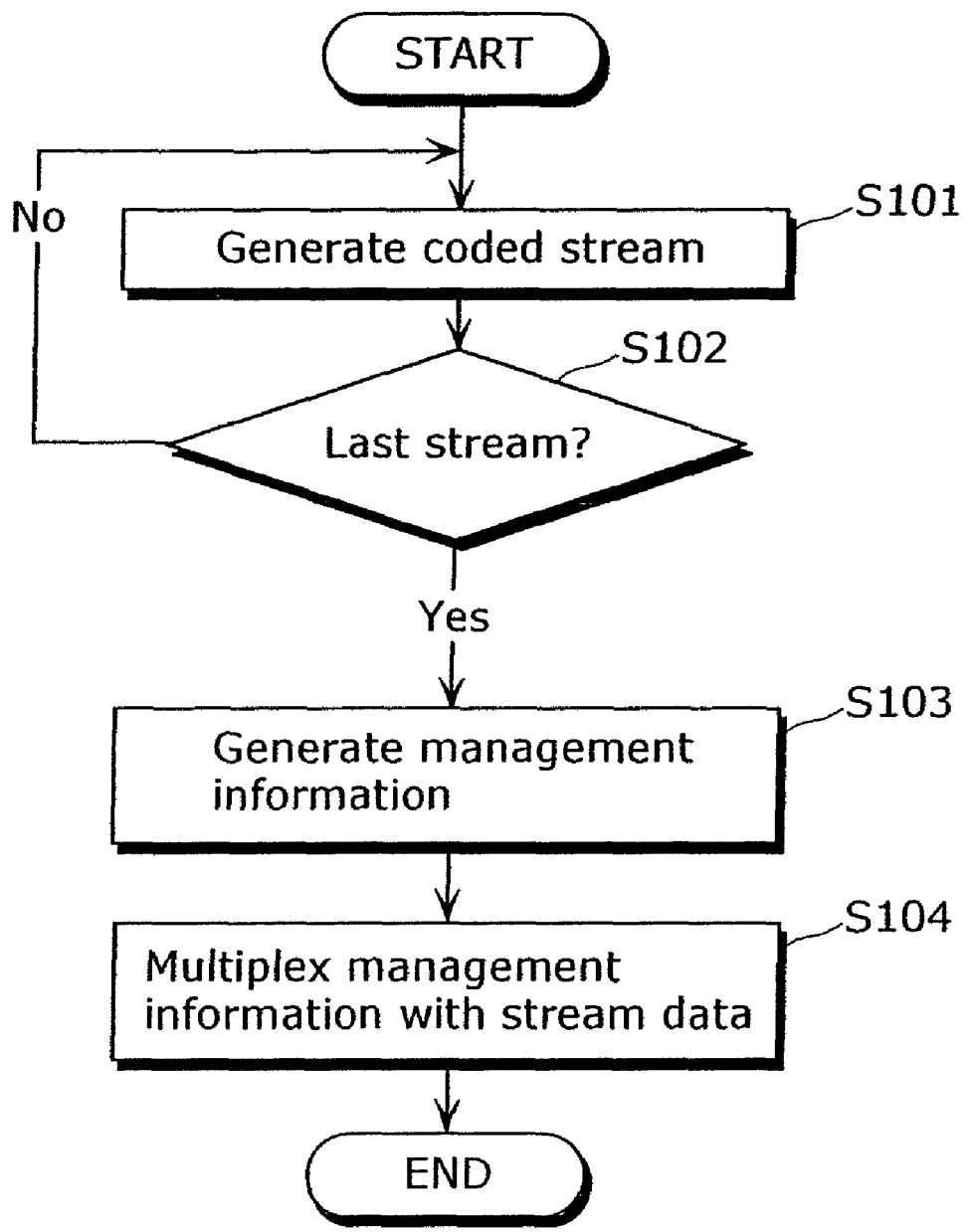

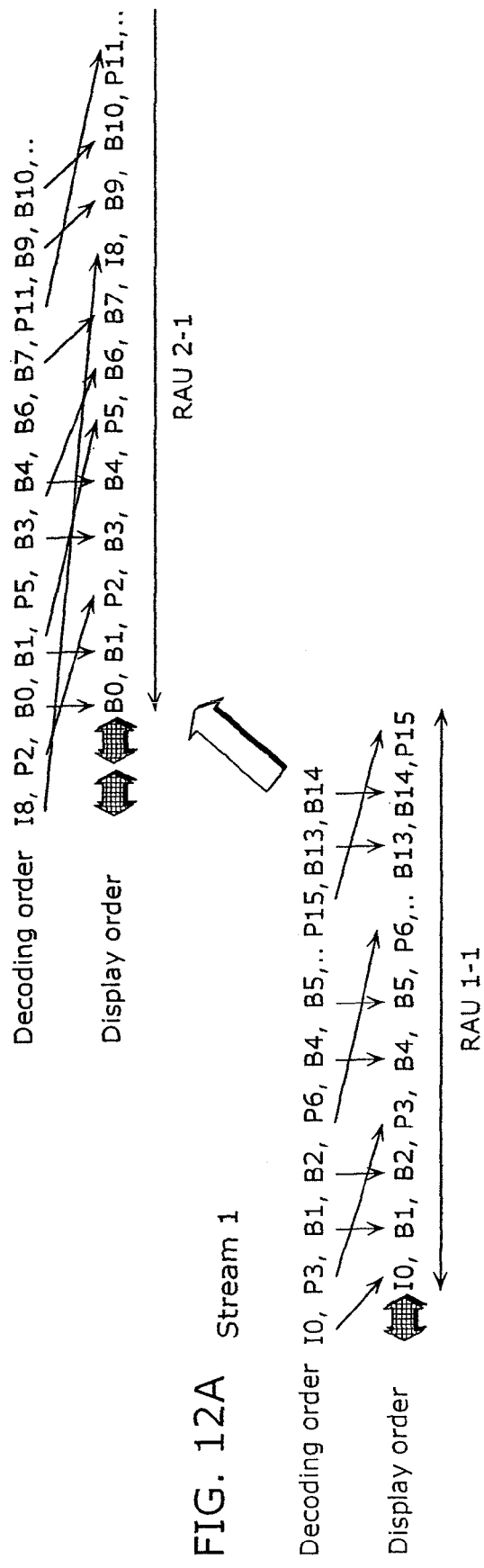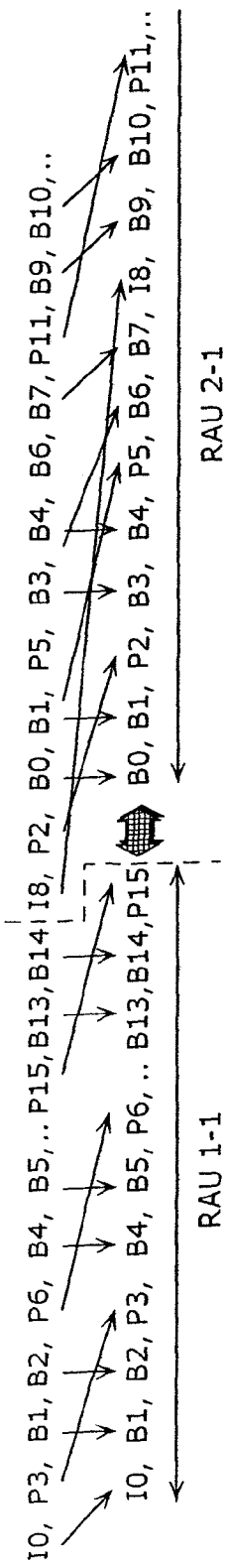

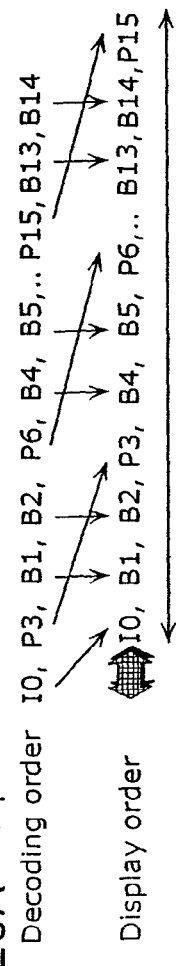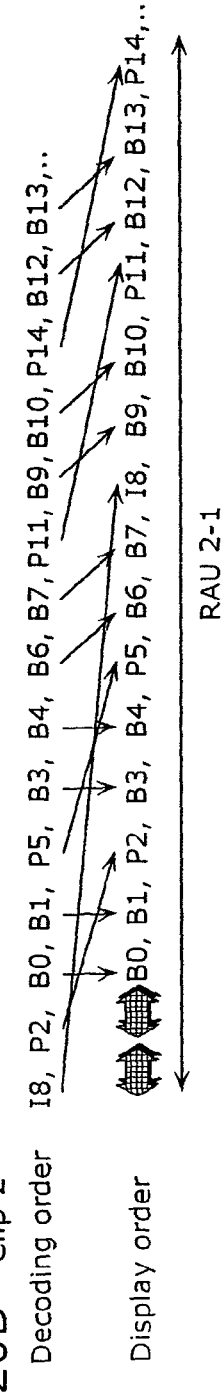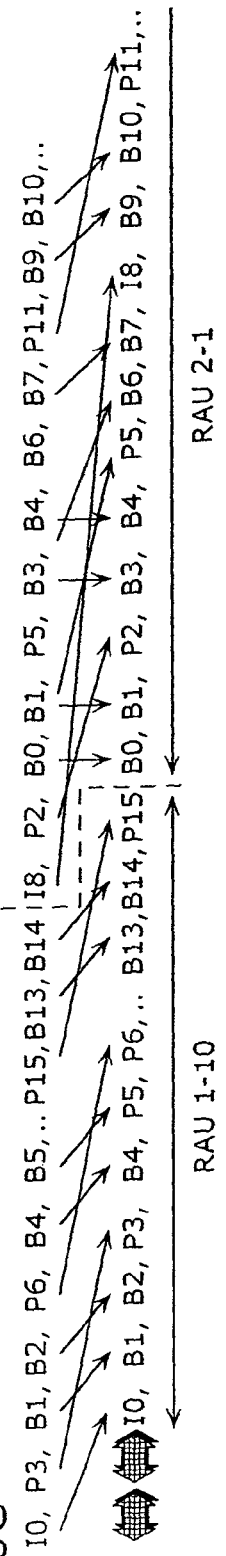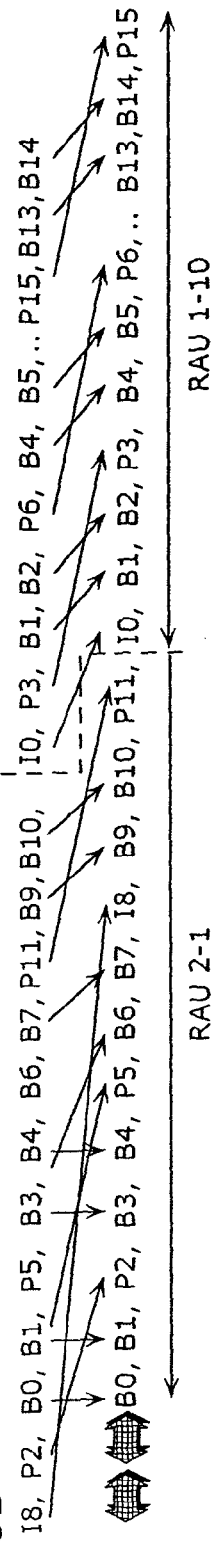
FIG. 20A Clip 1
FIG. 20B Clip 2
FIG. 20C
FIG. 20D

MULTIPLEXING APPARATUS AND DEMULTIPLEXING APPARATUS

This application is a divisional of application Ser. No. 10/591,242, Aug. 31, 2006 now U.S. Pat. No. 7,526,031 which is the National Stage of International Application No. PCT/JP2005/010453, filed Jun. 1, 2005.

TECHNICAL FIELD

The present invention relates to a multiplexing apparatus for multiplexing one or more coded streams including coded pictures with other information so as to generate multiplexed data and a demultiplexing apparatus for demultiplexing the multiplexed data. The present invention especially relates to a multiplexing apparatus and a demultiplexing apparatus which can perform special playback such as multi-angle playback or the like.

BACKGROUND ART

Recently, the multi-media era has come in which sound, pictures and other pixel values are integrated into one media, and conventional information media as communication tools like newspapers, magazines, TV, radio and telephone are regarded as the targets of multi-media. Generally, multi-media is a form of simultaneous representation of not only characters but also graphics, sound, and especially pictures. In order to handle the above-described conventional information media as multi-media, it is a requisite to represent the information digitally.

However, it is unrealistic to directly process a huge amount of information digitally using the above-described conventional information media because, when calculating the data amount of each information medium described above as digital data amount, data amount per character is 1 to 2 bytes while that of sound per second is not less than 64 Kbits (telephone speech quality) and that of moving pictures per second is not less than 100 Mbits (present TV receiving quality). For example, a TV telephone has already become commercially practical thanks to Integrated Services Digital Network (ISDN) with a transmission speed of 64 kbps to 1.5 Mbps, but it is impossible to transmit moving pictures of TV camera as they are using ISDN.

That is why information compression technique is necessary. For example, a moving picture compression technique standard of H. 261 or H. 263 which is recommended by the International Telecommunication Union-Telecommunication Standardization Sector (ITU-T) is used for TV telephones. Also, with the information compression technique of the MPEG-1 standard, it becomes possible to store image information, together with sound information, in a normal CD (Compact disc) for music.

Here, Moving Picture Experts Group (MPEG) is an international standard to digitally compress moving picture signals, and has been standardized by the ISO/IEC (the International Standardization Organization/International Engineering Consortium). MPEG-1 is the standard to compress moving picture signals down to 1.5 Mbps, that is, to compress TV signal information to about one hundredth. Also, the quality which satisfies the MPEG-1 standard is medium level which can be realized at a transmission rate of about 1.5 Mbps. MPEG-2 is thus standardized in order to satisfy the need for higher picture quality, and it compresses moving picture signals to 2 to 15 Mbps. At present, the work group (ISO/IEC JTC1/SC29/WG11), which standardized MPEG-1 and MPEG-2, has standardized MPEG-4 with a higher compression rate. The MPEG-4 standard (i) achieves a compression rate higher than those of MPEG-1 standard and MPEG-2 standard, (ii) enables coding, decoding and performing operations on an object-by-object basis, and (iii) realizes new functions necessary in this multimedia era. The initial object of MPEG-4 standard is to standardize a coding method of pictures with low bit rates, but the object is extended to a general purpose coding method of interlace pictures with high bit rates. After that, ISO/IEC and ITU-T, in combination, has standardized MPEG-4 AVC (Advanced Video Coding) as a next generation picture coding method of pictures with a high compression rate. This is expected to be used for next generation optical disc related apparatuses or in broadcasting for mobile terminals.

Generally, in coding moving pictures, information amount is compressed by reducing temporal and spatial redundancies. In the inter picture prediction coding aiming to reduce temporal redundancies, motion estimation and prediction picture generation are performed on a block-by-block basis with reference to a forward picture or a backward picture, and coding is performed on the differential value between the obtained prediction picture and the picture to be coded. Here, "picture" used here is a term representing one picture. In a progressive picture, a picture means a frame, but in an interlace picture, it means a frame or a field. An "interlace picture" described here means a frame composed of two fields with a slight time lag. In the coding and decoding processes of interlace pictures, it is possible to process a frame as it is, as two fields, or on a frame-by-frame or on a field-by-field of each block in a frame.

The picture for performing intra prediction coding without referring to any reference picture is called Intra Coded Picture (I picture). Also, the picture for performing inter prediction coding referring to only a picture is called Predictive Coded Picture (P picture). Also, the picture for performing inter prediction coding referring to two reference pictures simultaneously is called Bi-predictive Coded Picture (B picture). A B picture can refer to two pictures selected as an arbitrary combination of a forward picture and a backward picture in display time. Such two reference pictures can be specified on a block-by-block basis, the block being a basic unit of coding and decoding. Those reference pictures are distinguished from each other as follows: the reference picture described earlier in the coded bit stream is called first reference picture, and the other reference picture described later is called second reference picture. Note that such reference pictures must have already been coded or decoded in order to code or decode an I picture, P pictures and B pictures.

Motion compensation intra prediction coding is used for coding of P pictures and B pictures. Motion compensation intra prediction coding is an intra prediction coding method in which motion compensation is applied. Motion compensation is a method for improving prediction precision and reducing data amount by estimating motion amount (called motion vector hereafter) of each block of a picture and by performing prediction coding considering the motion vector. For example, data amount is reduced by estimating motion vectors of pictures to be coded and by coding each prediction residual between each prediction value which is shifted by the amount of each motion vector and each current picture to be coded. In the case of this method, since motion vector information is needed in decoding, motion vectors are also coded, and recorded or transmitted. Motion vectors are estimated on a macro block by macro block basis. To be more specifically, motion vectors are estimated by fixing the macro block of a picture to be coded, moving the macro block of a reference picture within the search range, and finding the location of the reference block which is closest to the standard block.

FIGS. 1A and 1B are structural diagrams of conventional MPEG-2 streams respectively.

As shown in FIG. 1B, an MPEG-2 stream has a hierarchical structure like will be described below. A stream is composed of a Group of Pictures (called GOP hereafter). The use of a GOP as a basic unit in coding processing enables editing a moving picture or performing a random access. A GOP is made up of an I picture, P pictures and B pictures. A stream, a GOP and a picture further includes a synchronous signal (sync) indicating a border of units and a header indicating the data common in the units, the units here being a stream, a GOP and a picture respectively.

FIGS. 2A and 2B respectively show examples indicating how to perform inter picture prediction coding which is used in MPEG-2.

The diagonally-shaded pictures in the figure are those pictures to be referred to by other pictures. As shown in FIG. 2A, in prediction coding in MPEG-2, P pictures (P0, P6, P9, P12 and P15) can refer to only a single picture selected as an immediately forward I picture or P picture in display time. Also, B pictures (B1, B2, B4, B5, B7, B8, B10, B11, B13, B14, B16, B17, B19, and B20) can refer to two pictures selected as a combination of an immediately forward I picture or P picture and an immediately backward I picture or P picture. Further, the order of pictures to be placed in a stream is determined. I pictures and a P picture are placed in the order of display time, and each B picture is placed immediately after an I picture to be displayed immediately after the B picture or immediately after a P picture. As a structural example of a GOP, as shown in FIG. 2B, pictures from I3 to B14 are grouped into a single GOP.

FIG. 3A to 3B show the decoding order, the display order and delay amounts which occur between decoding time and display time of a GOP structure used in an MPEG-2 stream respectively.

Here, the MPEG-2 stream has a fixed frame rate, and the B pictures are decoded and displayed simultaneously. In an MPEG-2 stream, as shown in FIGS. 3A and 3B, the delay amount which is the time lag from the decoding time of the top picture of the GOP to the display time of the top picture is equivalent to one frame or two fields at maximum. This delay amount will be called frame delay hereafter, and the length of a frame delay will be counted on a frame by frame basis (one frame corresponds to two fields). Optical disc apparatuses such as a Digital Versatile Disk (DVD) employs the MPEG-2 standard in which it is defined that frame delays are fixed at one. Note that delay amounts are changeable at the time of pulling down such as displaying, at 60 Hz, the streams that have been coded at 24 Hz. Since it is possible to determine the delay amounts based on the case of displaying the coded streams according to the frame rate, a case of displaying the coded streams according to the frame rate will be described below.

FIG. 4 is a structural diagram of an MPEG-4 AVC stream. There is no concept equivalent to a GOP in the MPEG-4 AVC. However, since it is possible to construct a randomly-accessible access unit equivalent to a GOP by segmenting data in a unit of a special picture which can be decoded without depending on other pictures, the unit will be called RAU (Random Access Unit) hereafter.

There are two types of I pictures in MPEG-4 AVC. They are an Instantaneous Decoder Refresh (IDR) and the rest. An IDR picture is the I picture which can decode all the pictures placed after the IDR picture in a decoding order, without referring to pictures placed before the IDR picture in the decoding order. An IDR picture corresponds to the top I picture of an MPEG-2 closed GOP. In the case of an I picture which is not an IDR picture, a picture placed after the I picture in the decoding order may refer to a picture placed before the I picture in the decoding order. Also, it is possible to form a structure like an open GOP in the MPEG-2 by placing an I picture that is not an IDR picture at the top of a random access unit RAU and restricting the predictive structure of pictures in the random access unit RAU.

FIG. 5 is an example of a prediction structure of pictures in an MPEG-4 AVC stream.

Since the MPEG-4 AVC allows flexible prediction structures, for example, picture P2 can refer to picture I8. In the example of FIG. 5, since display is started after picture I8 and picture P2 are decoded first, the frame delay becomes two. Since prediction structures are flexible in this way, frame delays are not limited to one at maximum like in the case of MPEG-2. This means that frame delays are variable depending on prediction structures. Therefore, it is impossible to perform playback on condition that frame delays are fixed at one.

Package media such as DVDs have a special playback function such as (i) playback where particular parts of the same stream are selectively played back or where different streams can be played back continuously and (ii) multi-angle playback where playback is performed changing streams with a different angle. The basic unit of using such a function is a GOP in the MPEG-2 and a random access unit RAU in the MPEG-4 AVC.

FIG. 6A to 6C show an example of changing streams to be played back in the MPEG-2. FIG. 6A to 6C respectively show the GOPs included in Stream 1, 2 and 3. Here, streams to be played back are changed from Stream 1 to Stream 2 by decoding GOP 2-1 next to GOP 1-1. This makes it possible to perform playback in a fixed rate without allowing the occurrence of a gap at the time of display because frame delay amounts are one both in the GOP1-1 and GOP2-1. Likewise, it is possible to change from Stream 1 to Stream 3 by decoding GOP3-1 next to GOP1-1.

Conventionally, various techniques relating to moving picture coding, multiplexing, decoding and demultiplexing like those described above have been proposed. (For example, refer to Japanese Laid-Open Patent Application No. 2003-18549 publication.)

FIG. 7 is a flow chart showing the operation of a conventional multiplexing apparatus for coding and multiplexing moving picture data.

First, in Step 101 and Step 102, the multiplexing apparatus codes one or more streams. Next, in Step 103, it generates management information and then goes to Step 104. Management information includes the information for accessing the stream generated in Step 101, the information indicating data to be played back at the time of special playback such as multi-angle playback or the like. After that, in Step 104, it multiplexes the management information with stream data and outputs the multiplexed data.

FIG. 8 is a block diagram showing the structure of a conventional multiplexing apparatus.

The multiplexing apparatus 800 includes a coding unit 11, a memory 12, a management information generation unit 13 and a multiplexing unit 14.

The coding unit 11 codes the inputted moving picture data Vin and stores the coded data strIn into the memory 12.

The management information generation unit 13 reads out the coded data from the memory 12 as read out data strOut 1, generates management information base and outputs the management information base to the multiplexing unit 14.

Note that the management information base does not include the information concerning frame delays.

The multiplexing unit 14 multiplexes (i) the management information base, (ii) read out data strOut 2 which has been read out from the memory 12, and (iii) addition information adInf such as setting information that is set by a user and that is obtained separately from the stream, and then outputs the multiplexed data MuxDat. Here, addition information adInf may not be used if it is not necessary. Also, the read out data strOut 2 may be packetized using a scheme such as MPEG-2 Transport Streams (TSs) or Program Streams (PSs), or other scheme predetermined by application, and then multiplexed. For example, in the Blu-ray Disc (BD) standard, the read out data strOut 2 is multiplexed using a scheme where 4-byte header is added to MPEG-2 TS packets called Source Packets, and then stored.

FIG. 9A shows the structural example of the multiplexed data outputted from the multiplexing apparatus 800.

As shown in FIG. 9A, management information and one or more coded stream are stored in the multiplexed data. Further, handling each stream as one or more clips makes it possible to realize various playback methods such as digest playback and multi-angle playback. Here, a clip shows one picture or a sequence of pictures in one random access unit RAU or a sequence of random access unit RAUs of the same stream, and the clip and the stream may be the same. FIGS. 9B and 9C show playback examples. Especially, FIG. 9B shows an example of multi-angle playback. In the case where Stream 1 and Stream N respectively store video at a different angle, it is possible to play back Clip N-2 of Stream N by changing angles next to Clip 1-1 of Stream 1 and return to the playback of Stream 1 after completing the playback of Clip N-2. FIG. 9C shows an example of digest playback. It is possible, for example, to play back typical scenes by selectively playing back Clip 1-1 and Clip 1-M in Stream 1.

FIG. 10 is a flow chart showing the operation of a conventional demultiplexing apparatus for demultiplexing the multiplexed data to obtain the coded data and playing back the coded data.

First, in Step S201, the demultiplexing apparatus demultiplexes the multiplexed data to obtain management information, obtains the information concerning the one or more clips to be played back, and then goes to Step 204. The information concerning clips includes start time or end time of the clips, access information used for accessing the coded data in the clips and the like. In Step 204 and Step 205, the demultiplexing apparatus decodes and displays pictures in the clips up to the last pictures in the clips. Here, in the case where an instruction indicating the completion of playback is made by user operation or the like, the playback is completed at the time when the instruction becomes valid.

FIG. 11 is a block diagram showing the structure of a conventional demultiplexing apparatus 900.

The demultiplexing apparatus 900 includes a management information demultiplexing unit 21, a clip information analysis unit 22, a decoding unit 24 and a display unit 26.

The management information demultiplexing unit 21 reads out multiplexed data MuxDat from a multiplexed data recording medium such as an optical disc, analyzes the management information, and determines clips to be played back according to the user instruction or a predetermined method. After that the management information demultiplexing unit 21 outputs, to the clip information analysis unit 22, the clip information Clip that is the information concerning the determined clips.

The clip information analysis unit 22 outputs, to the decoding unit 24, access information acs used for accessing the pictures that constitute the clips. On the other hand, the decoding unit 24 reads out the video data Vdat from the multiplexed data recording medium based on the access information acs, decodes the read-out data, and outputs the decoding result decOut to the display unit 26. The display unit 26 displays the decoding results in the display order.

The MPEG-4 AVC allows flexible prediction structures, and thus frame delays of clips are variable. Since a conventional demultiplexing apparatus changes clips without considering frame delays of clips, a gap in a display interval of pictures occurs at the time of changing clips with a different frame delay.

FIG. 12A to 12C show an example of changing from the clip with one-frame delay to the frame with two-frame delay.

FIG. 12A shows the random access unit RAU1-1 of Stream 1 with one-frame delay, while FIG. 12B shows the random access unit RAU2-1 of Stream 2 with two-frame delay. Here, FIG. 12C shows the timing of decoding and displaying at the time of playing back the RAU2-1 next to the RAU1-1.

Since the frame delay of RAU1-1 is one, at the time when picture P15 that is the last in the decoding order of RAU1-1 is displayed, picture I8 that is the top picture of RAU2-1 is decoded. However, the frame delay of RAU2-1 is two, at the time when picture P2 that is the second in the decoding order is decoded, display of the pictures in the RAU2-1 has yet to be started. Therefore, there is no picture to be displayed at the time when picture P2 is decoded. Consequently, a gap in a display interval occurs between picture P15 and picture B0.

Likewise, in the case of playing back the random access unit RAU1-1 after the random access unit RAU2-1, a gap occurs in the decoding interval to display pictures continuously. In other words, there occurs an overlap in the display interval. A gap in the display order means, hereinafter, discontinuity at a connection that occurs in both cases where frame delay amount at a connection increases and decreases.

As described up to this point, conventional multiplexing and demultiplexing apparatuses have a problem of making a user who watches the moving picture feel uncomfortable because the conventional demultiplexing apparatus cannot display pictures placed at the part at which clips with a different frame delay are changed, maintaining a fixed frame.

The present invention is conceived in order to solve the above-described problem. An object of the present invention is to provide a multiplexing apparatus for multiplexing the coded stream with other information so as to generate multiplexed data and a demultiplexing apparatus for demultiplexing the multiplexed data to play back the coded stream so that they do not make the user feel uncomfortable even at the time of performing any special playback such as multi-angle playback.

DISCLOSURE OF INVENTION

In order to achieve the above-described object, the multiplexing apparatus, of the present invention, multiplexes one or more coded streams with other information, the coded streams including coded pictures in a unit of a randomly-accessible access unit, the multiplexing apparatus including: a coding unit for generating the coded streams so that no gap occurs at a connection of predetermined two access units in a process of decoding, in sequence, the two access units in all of access units included in the coded streams; and a multiplexing unit for multiplexing, with the other information, the coded streams generated by the coding unit. For example, in a first aspect of the present invention, the coding unit generates the coded streams so that delay amounts in the two access units become equal to each other, each of the delay amounts being a time lag from when a top picture in a decoding order is decoded to when a top picture in a display order is displayed.

In this way, coded streams are generated so that delay amounts (frame delays) of two access units (such as clips) on which special playback is performed become equal to each other. Therefore, no gap occurs at the connection of these access units at the time when these access units are decoded in sequence. In other words, these access units are connected to each other seamlessly at the time of special playback. This means the frame rates become invariable. Consequently, it becomes possible to eliminate making a user who watches a moving picture made up of these access units feel uncomfortable. Here, for example, coded streams are generated so that the delay amounts of these two access units are adjusted to predetermined delay amounts in the case where delay amounts are predetermined according to the operation standard of an application program.

Also, in a second aspect of the present invention, the multiplexing apparatus may further include a delay information generation unit for generating delay information concerning the delay amounts, in the apparatus, the multiplexing unit may multiplex, with the other information, the delay information generated by the delay information generation unit. For example, in a third aspect of the present invention, the delay information generation unit generates the delay information indicating the delay amounts. Otherwise, in the third aspect of the present invention, the delay information generation unit generates, as the delay information, a flag indicating that the two access units can be connected seamlessly.

In this way, the demultiplexing apparatus can easily obtain the delay amounts in these two access units through the delay information in the case where the delay information (frame delay information) indicates delay amounts. Also, the demultiplexing apparatus can easily obtain the delay amounts in these two access units in the case where a flag as delay information indicates that the delay amounts of these two access units are equal to each other. Consequently, it is possible to cause the demultiplexing apparatus to perform more proper demultiplexing processing.

Also, in the second aspect of the present invention, the coding unit may generate the coded streams so that no gap occurs at a connection of the two access units in all of the access units included in the coded streams, the connection being an angle changeable point.

Since these two access units have a different angle, no gap occurs at the connection of these access units at the time when these access units are decoded in sequence likewise the earlier described case. In other words, these access units are connected in a seamless multi-angle manner. This means that the frame rates are invariable. Consequently, it becomes possible to eliminate making a user who watches a moving picture made up of these access units with a different angle feel uncomfortable.

Also, in order to achieve the above-described object, the demultiplexing apparatus, of the present invention, demultiplexes multiplexed data, the multiplexed data including: (i) coded streams including coded pictures in a unit of a randomly-accessible access unit; and (ii) delay information concerning delay amounts in predetermined two access units in all of access units, each of the delay amounts being a time lag from when a top picture in a decoding order is decoded to when a top picture in a display order is displayed, and the demultiplexing apparatus including: a delay information demultiplexing unit for demultiplexing the multiplexed data to obtain the delay information; and a playback unit for decoding and playing back the access units in sequence according to the delay information obtained when the delay information demultiplexing unit has demultiplexed the multiplexed data.

In an example case where coded streams are generated so that delay amounts of these two access units (such as clips) on which special playback is performed, it becomes possible to decode and play back these two access units in sequence without allowing the occurrence of a gap at the connection of these two access units at the time of special playback. In other words, it becomes possible to connect these access units seamlessly. This means that it becomes possible to make the frame rates invariable. Consequently, it also becomes possible to eliminate making a user who watches the moving picture made up of these access units feel uncomfortable. Also, in an example case where delay amounts are indicated by delay information (frame delay information), it is possible to easily obtain the delay amounts of these two access units through the delay information. Further, in the case where the delay information is indicated using a flag, it is possible to easily obtain the information indicating that the delay amounts of these two access units are equal to each other. Consequently, it is possible to perform more proper demultiplexing processing.

Also, in order to achieve the above-described object, in the multiplexing method of the present invention, a moving picture is coded and the coded moving picture is multiplexed with management information, the multiplexing method including: generating one or more coded streams; obtaining frame delays in the coded streams; generating management information including the information indicating the obtained frame delays; and multiplexing the coded streams with the management information. In the multiplexing method, the coded streams are made up of one or more random access units, the frame delays indicate the delay amounts that occur respectively during the time periods from when the top picture in the decoding order is decoded to when the top picture in the display order is displayed in these random access units, and the frame delays in the coded streams are variable.

Also, the management information may include the frame delays of the coded streams.

Also, the management information may include the maximum value of the frame delays in the coded streams.

Also, the management information may include the equal frame delays as common frame delays in the coded streams at the time when the frame delays are equal to each other.

Also, the management information may include the frame delays based on a playback unit made up of these random access units.

Further, the demultiplexing method of the present invention is the demultiplexing method for demultiplexing the data multiplexed according to the multiplexing method and playing back the resulting demultiplexed data. The demultiplexing method includes: obtaining the frame delays of the coded streams to which these random access units to be played back belong; determining the frame delays at the time of playback based on the obtained frame delays; and playing back pictures included in these random access units according to the determined frame delays.

Also, in the determination of frame delays, these random access units that follow the current random access unit may be played back with the frame delays equal to the frame delay of the random access unit that has just been played back as the current random access unit.

Note that the present invention can be realized not only as the multiplexing apparatus, the demultiplexing apparatus, the multiplexing method and the demultiplexing method that have been described above but also a program for the multiplexing apparatus and the demultiplexing apparatus, a recording medium for storing the program and the multiplexed data generated by the multiplexed apparatus.

Up to this point, since the present invention makes it possible to guarantee display with a fixed frame rate even at the time of special playback, it is possible to eliminate making a user feel uncomfortable. Especially, the present invention makes it possible to improve the playback quality of a package medium, and thus it is highly practical.

Further Information about Technical Background to this Application

The disclosure of Japanese Patent Application No. 2004-165030 filed on Jun. 2, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIGS. 2A and 2B are illustrations of the structures of a GOP in the MPEG-2 stream;

FIGS. 3A and 3B are illustrations of frame delays in MPEG-2 streams;

FIG. 6A to 6C are diagrams showing examples of how clips are changed in MPEG-4 AVC streams;

FIG. 7 is a flow chart showing the operation of a conventional multiplexing apparatus;

FIG. 12A to 12C are diagrams showing examples of problems that occur at the time of playing back the multiplexed data outputted by the conventional multiplexing apparatus;

FIG. 20A to 20D are diagrams showing the operation examples of the demultiplexing apparatus at the time of determining a frame delay in playback in the third embodiment of the present invention;

BEST MODE FOR CARRYING OUT THE INVENTION

Embodiment of the present invention will be described below with reference to figures.

First Embodiment

Figure 13:
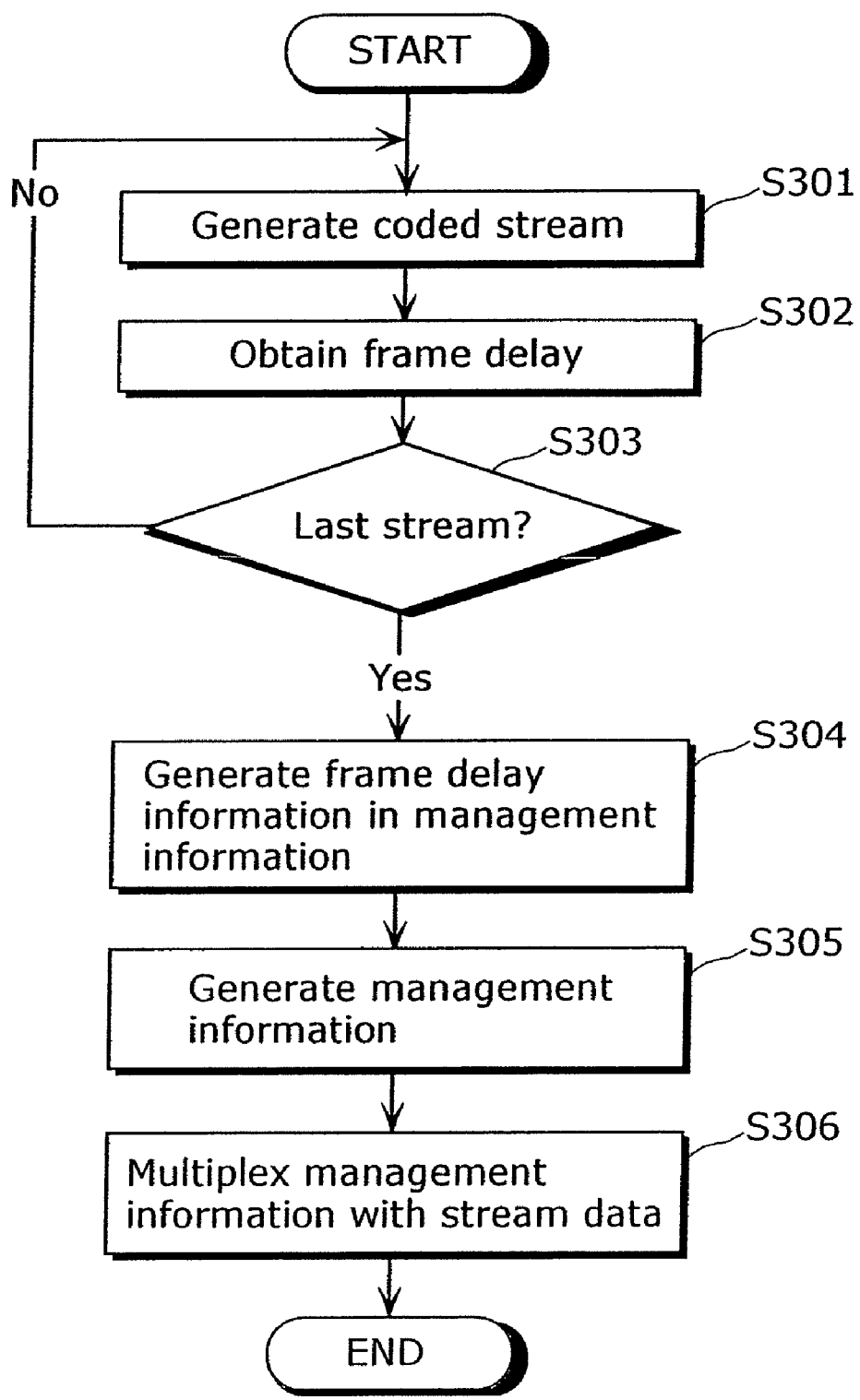
FIG. 13 is a flow chart showing the operation of the multiplexing apparatus in a first embodiment of the present invention.

FIG. 13 is a flow chart showing the operation of the multiplexing apparatus in a first embodiment of the present invention. The multiplexing apparatus outputs multiplexed data that can indicate frame delay information of the coded stream to be stored in the multiplexed data.

First, in Step 301, the multiplex apparatus generates MPEG-4 AVC coded streams. In Step 302, it obtains frame delays of the coded stream generated in Step 301, and goes to Step 303. In Step 303, it judges whether or not all the coded streams to be stored in the multiplexed data have already been generated, and repeats processing of Step 301 and Step 302 until all the coded streams have been generated. In Step 304, it generates frame delay information to be stored as management information of multiplexed data, and goes to Step 305. In Step 305, it generates management information indicating frame delay information in addition to the information generated by a conventional multiplexing apparatus. Lastly, in Step 306, it multiplexes the coded streams generated in Step 301 with the management information generated in Step 305, and then it outputs the multiplexed data.

Figure 14:
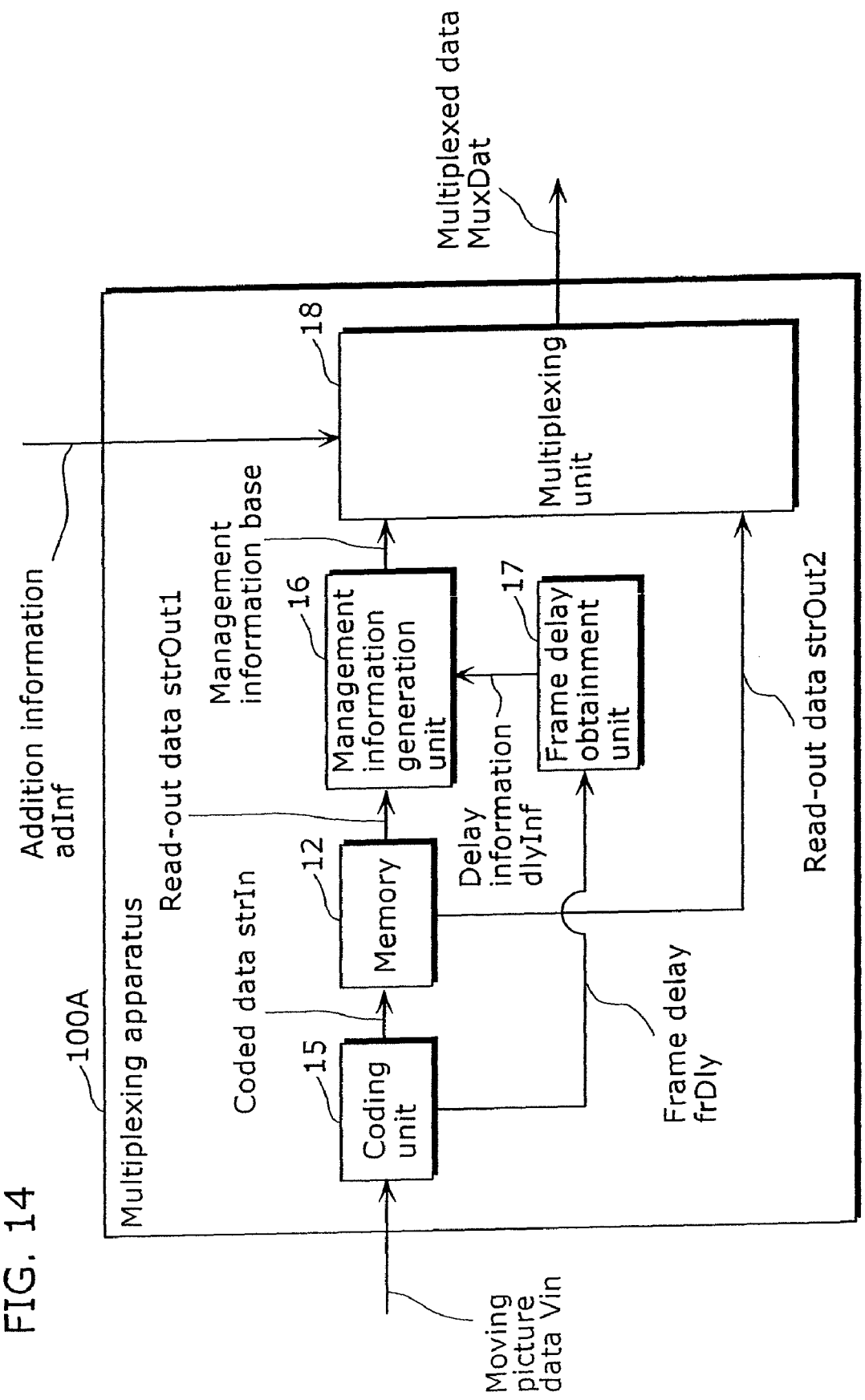
FIG. 14 is a block diagram showing the multiplexing apparatus in the first embodiment of the present invention.

FIG. 14 is a block diagram showing the structure of the multiplexing apparatus in the first embodiment of the present invention.

The multiplexing apparatus 100A includes a coding unit 15, a memory 12, a management information generation unit 16, a frame delay obtainment unit 17 and a multiplexing unit 18.

Figure 1A:
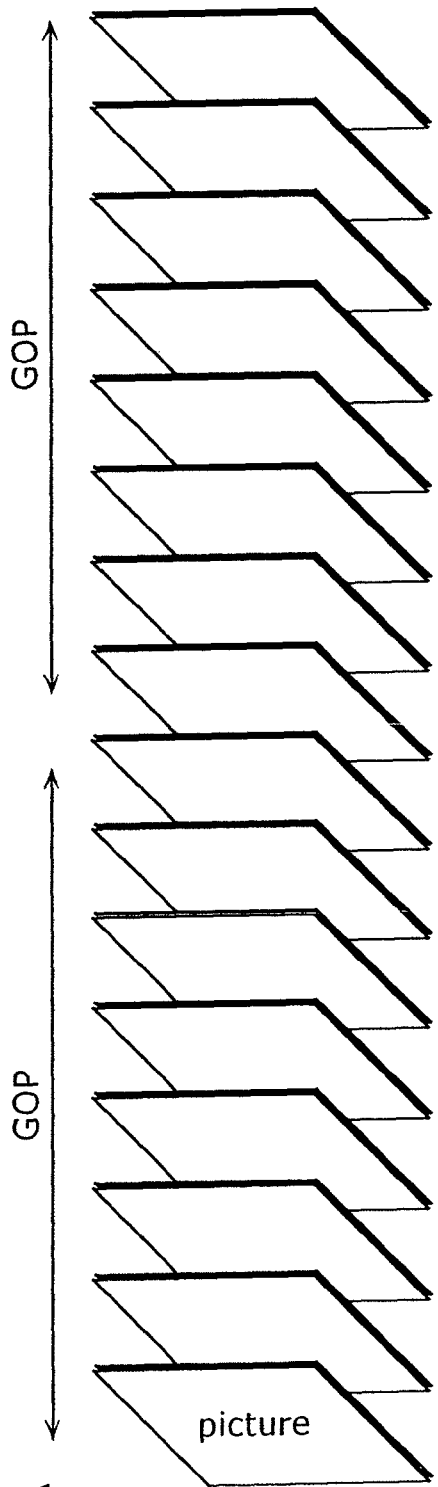
FIGS. 1A and 1B are illustrations of the structure of an MPEG-2 stream.
Figure 1B:
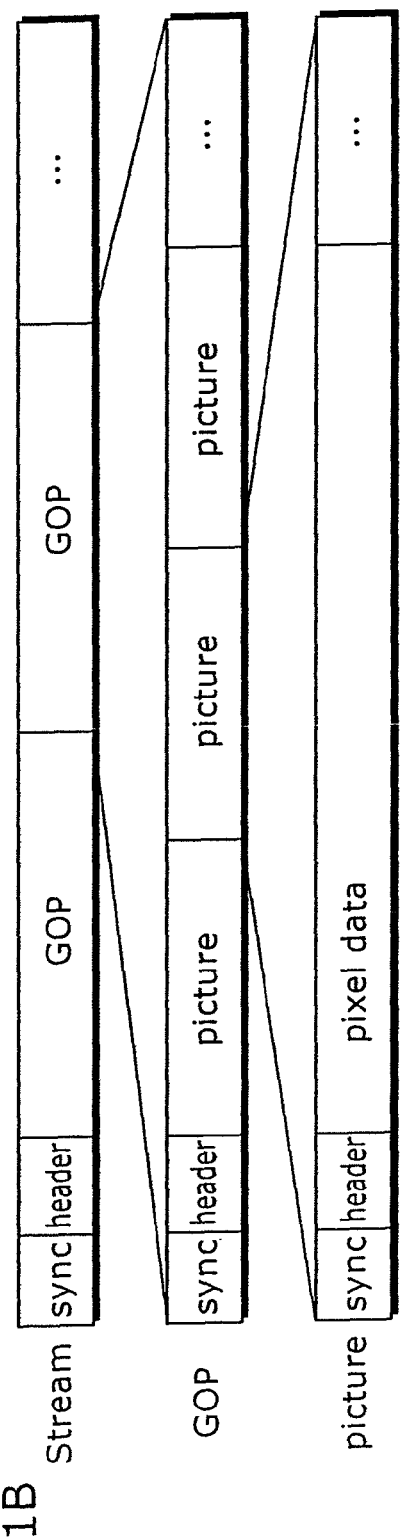
Figure 4:
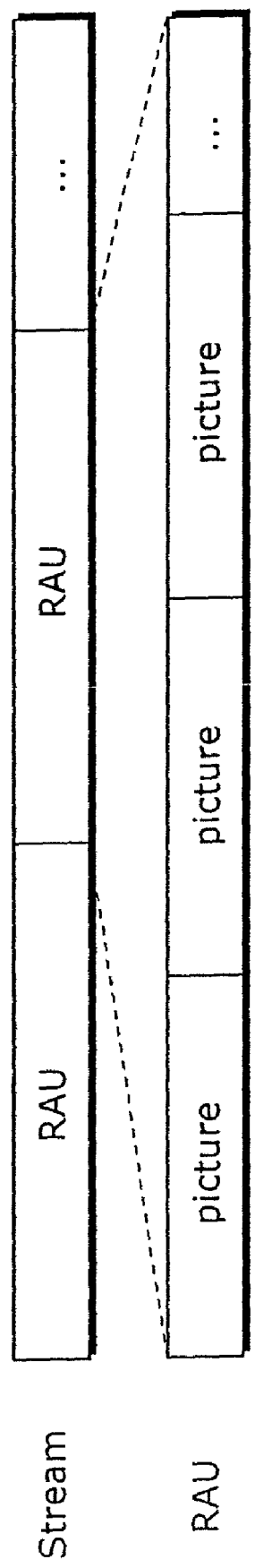
FIG. 4 is a diagram showing the structure of an MPEG-4 AVC stream.
Figure 5:
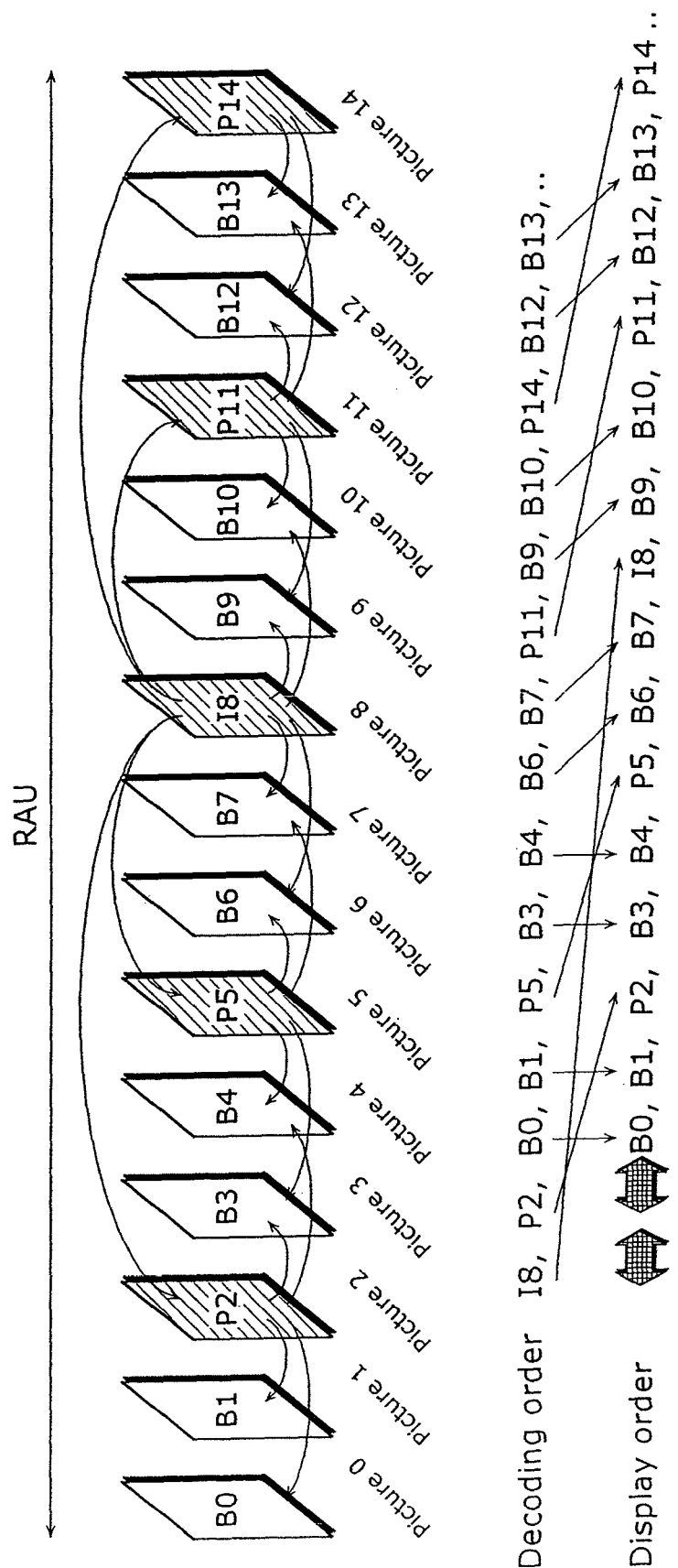
FIG. 5 is a diagram showing an example of a prediction structure in the MPEG-4 AVC stream.
Figure 8:
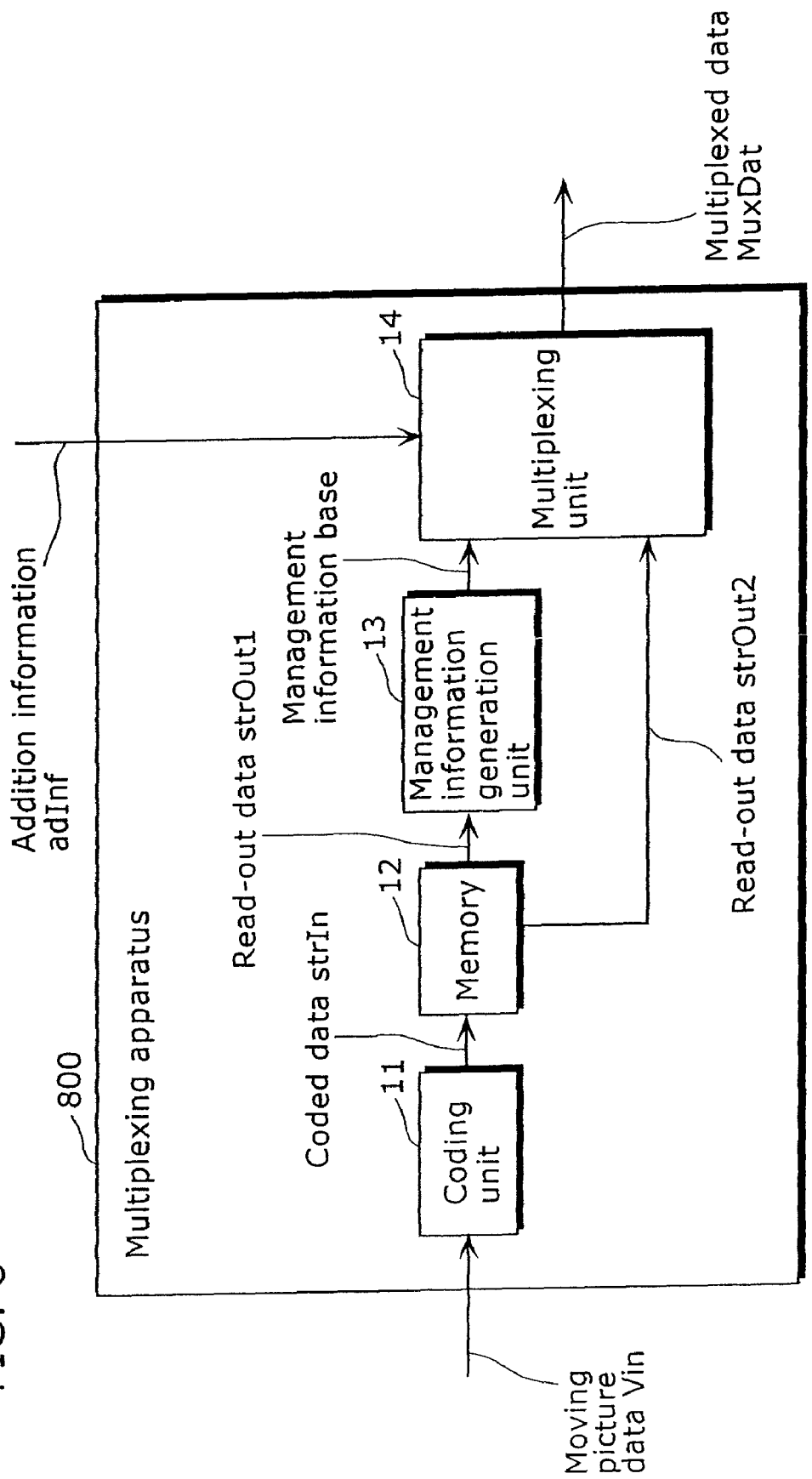
FIG. 8 is a block diagram showing the structure of the conventional multiplexing apparatus.
Figures 9A, 9B, 9C:
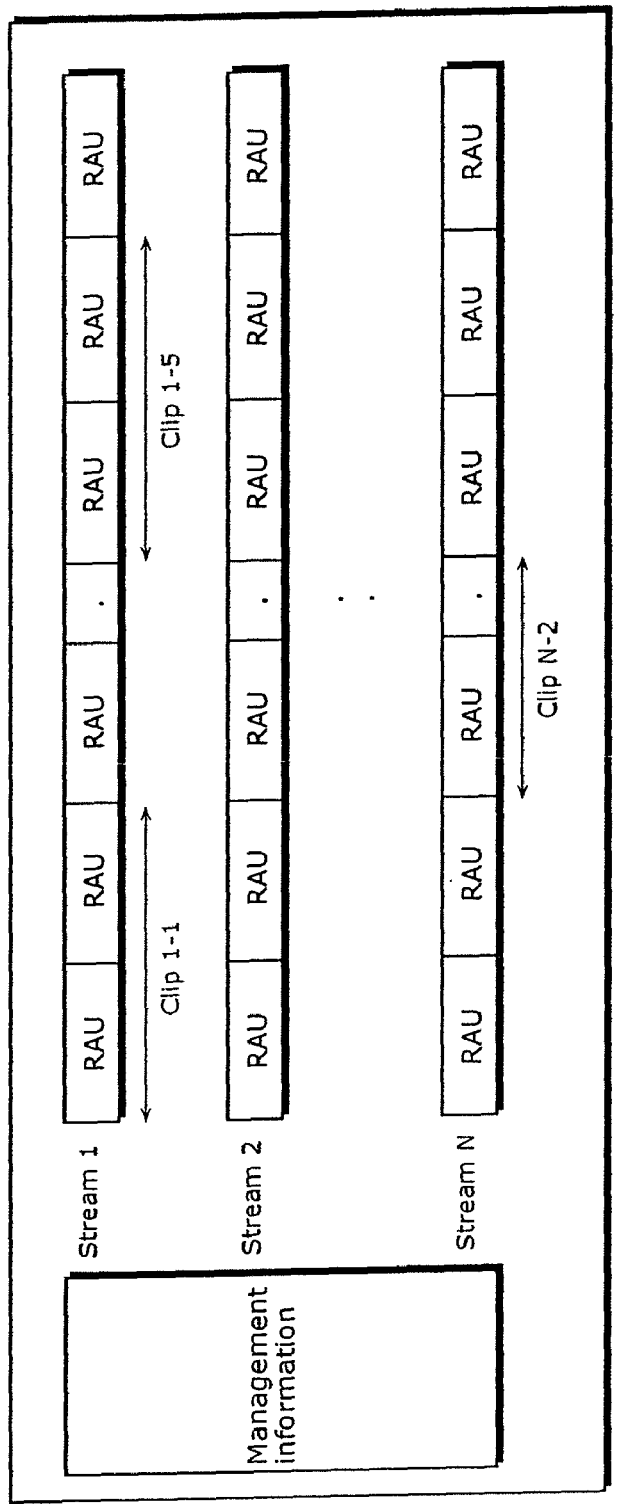
FIG. 9A to 9C are diagrams showing structure examples of the data outputted from the conventional multiplexing apparatus.
Figure 10:
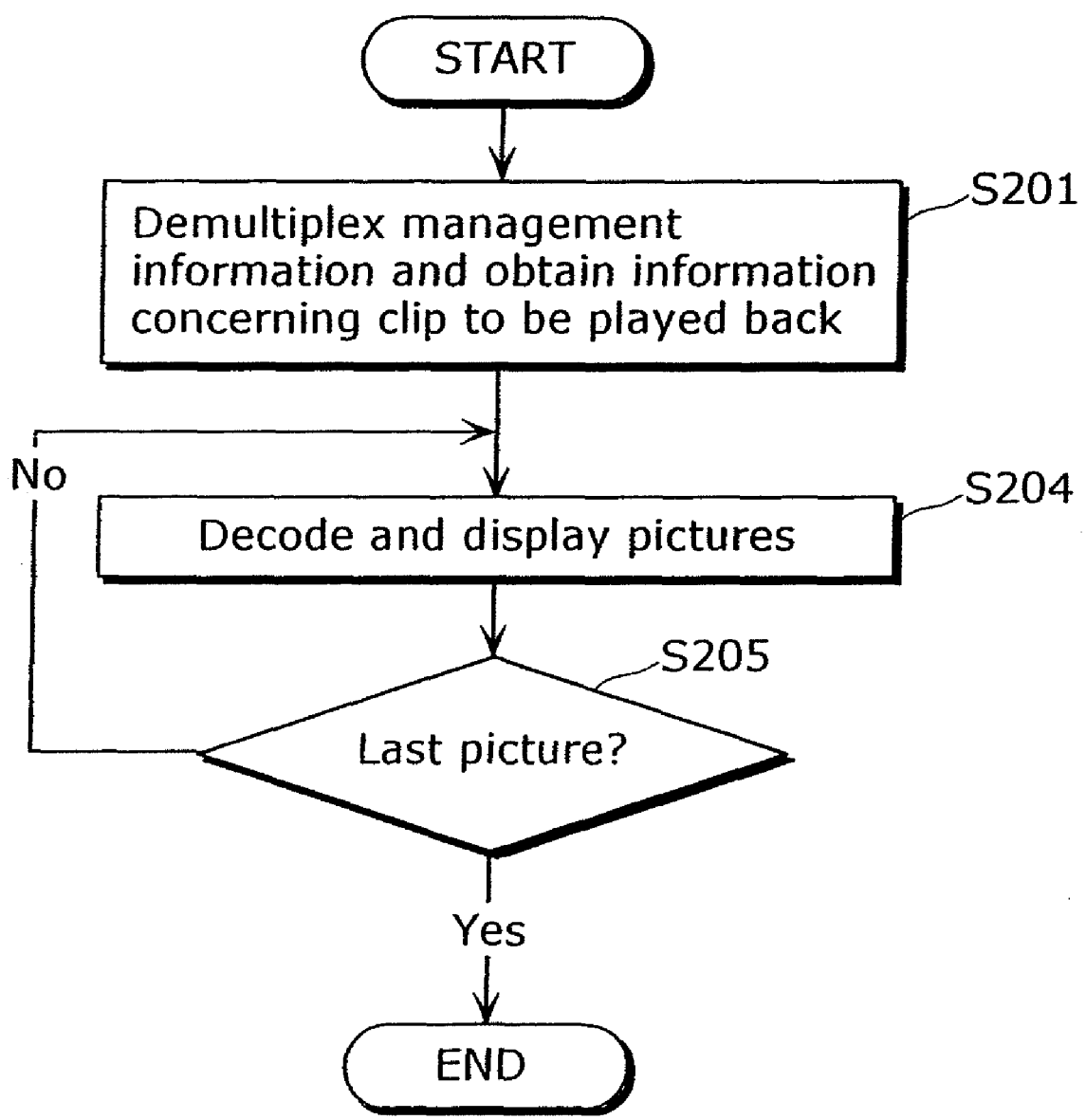
FIG. 10 is a flow chart showing the operation of the conventional multiplexing apparatus.
Figure 11:
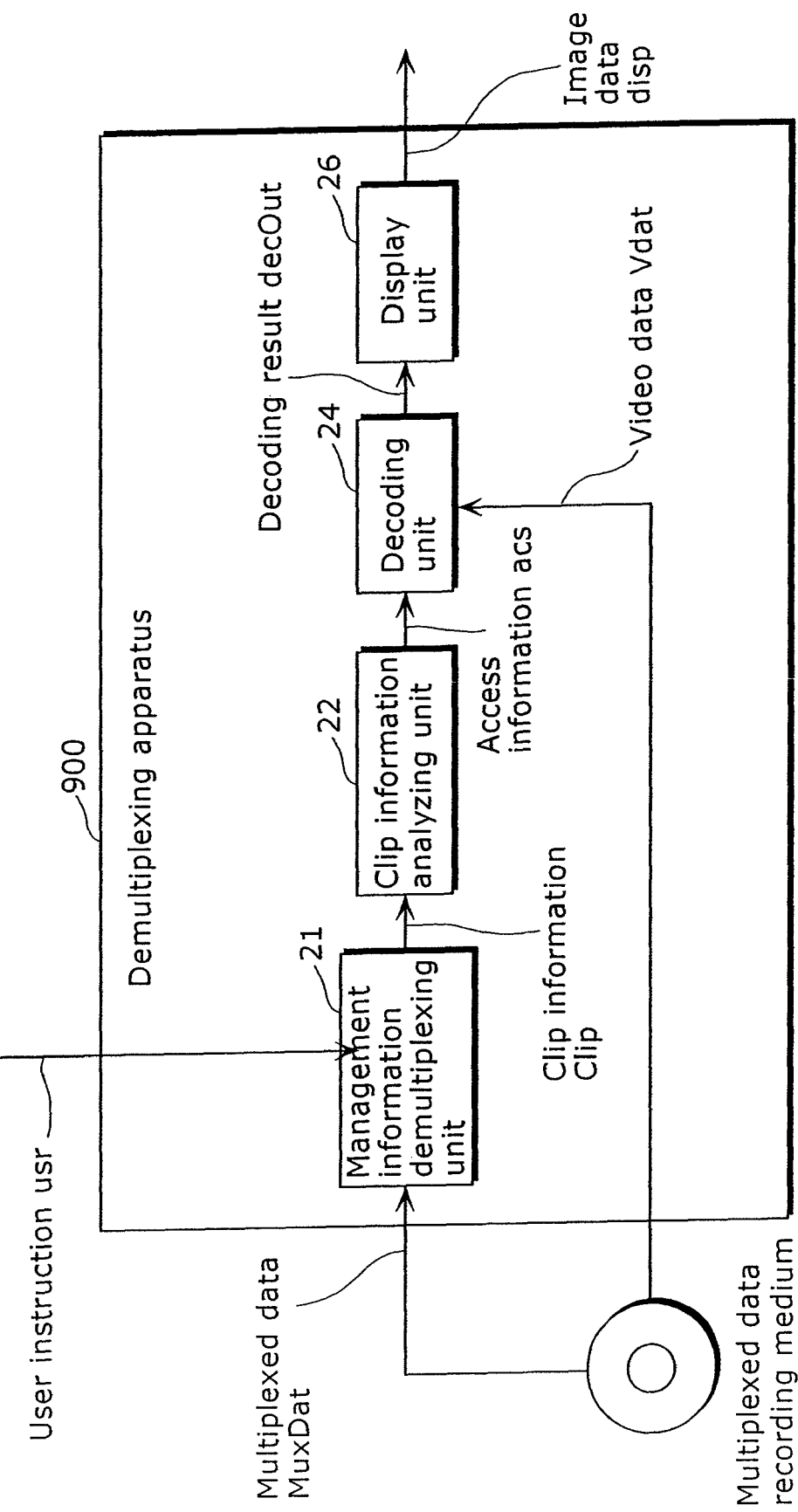
FIG. 11 is a block diagram showing the structure of the conventional multiplexing apparatus.

Note that the same components of the above-described components of the multiplexing apparatus 100A of this embodiment as the conventional multiplexing apparatus shown in FIG. 8 are assigned the same reference numbers, and such components will not be described here again.

The coding unit 15 codes the inputted moving picture data Vin, and stores the resulting coded data strIn into the memory 12. Also, it outputs, to the frame delay obtainment unit 17, frame delay frDly of the coded data strIn.

The frame delay obtainment unit 17 generates delay information dlyInf to be stored in the management information as the frame delay information, and then outputs it to the management information generation unit 16.

The management information generation unit 16 generates management information base based on the analysis result of the coded data strIn read out from the memory 12 as read-out data strOut 1 and the delay information dlyInf, and then outputs it to the multiplexing unit 18.

The multiplexing unit 18 multiplexes the management information base, the read out data strOut 2 read out from the memory 12 and addition information adInf, being setting information by user, to be obtained separately from the coded data, and then outputs the multiplexed data MuxDat. Note that the frame delay at the time of coding may be limited to a predetermined value or below, the frame delay being set by the coding unit 15.

FIG. 15A to 15E show the structural example of the multiplexed data outputted by the multiplexing apparatus 100A.

Figure 15:
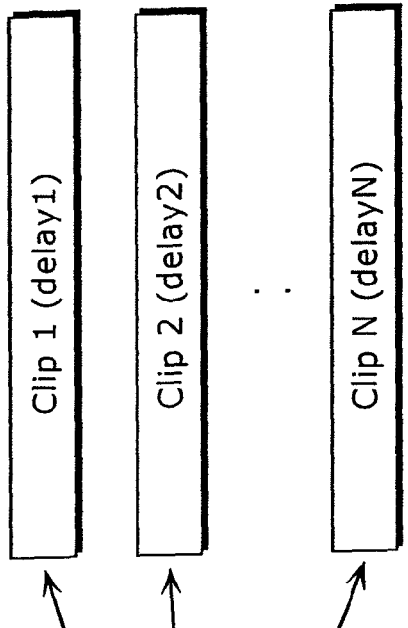
FIG. 15A to 15E are diagrams showing examples of data structures outputted by the multiplexing apparatus in the first embodiment of the present invention.

The multiplexed data shows frame delay information of clips to be stored in the multiplexed data as shown in FIG. 15A. Here, N numbers of clips are stored in the multiplexed data, and frame delays are from delay 1 to delay N. Note that respective clips may be the unit indicating different areas in the same coded stream, or may be the clips that belong to different coded streams.

FIG. 15B to 15D show examples of frame delay information. FIG. 15B stores frame delays of respective clips as table information. FIG. 15C shows the maximum value of frame delays of the clips. As the maximum value, the maximum value among the frame delays of all the clips to be stored in the multiplexed data may be shown, or the maximum value among the frame delays of the clips to be played back in sequence may be shown based on a play list. Also, a predetermined value may be shown as the maximum value. FIG. 15D shows the value of frame delay to be used in common among the respective clips. In the case where frame delays of the respective clips are variable, these values may be shown. Also, in the case where frame delays of the respective clips are invariable, frame delays used at the time of playback may be shown. FIG. 15E shows whether or not frame delays of the clips are equal to each other. For example, flag information indicating whether or not these frame delays are equal to each other is stored. Note that the information shown in FIG. 15B to 15D may be used in combination.

Note that frame delay information concerning only particular clips may be shown. First, it is possible to show the frame delay information concerning clips to be used for multi-angle playback or digest playback based on the playback method of clips. Also, it is possible to set frame delay based on the attribute of the top random access unit in a clip. For example, in the case where it is defined that angles are changed at an IDR picture, frame delay information only concerning a clip whose top random access unit is an IDR picture may be shown. Also, frame delay information may be shown only in the case of digest playback in which it is guaranteed that clips are connected to each other seamlessly.

Also, frame delay information of the coded streams to be stored in the multiplexed data may be shown without directly showing the frame delay information of the respective clips. At this time, it is possible to show frame delays of the respective clips by associating the coded stream to which each clip belong with the information indicating the frame delays of the coded stream. This method may be used both (i) in the case where frame delays of the respective clips in the same coded stream are invariable and (ii) in the case where the maximum value of frame delays of the clips included in the same coded stream is shown.

In the case of using an application standard, such as the Blu-Ray Disc (BD) or a High Definition (HD)-DVD, for which it is defined that frame delays should be equal to each other or for which the maximum value or a predetermined value among frame delays is defined, it should be noted that frame delays may not be stored as management information because such an application standard shows the information concerning the frame delays.

Also, in the case of receiving multiplexed data via a network by using a protocol such as TS or Real-time Transmission Protocol (RTP), frame delay information may be obtained as playback control information. For example, in the case of using the Session Description Protocol (SDP) at the time of notifying a playback terminal the playback control information, it is possible to describe the frame delay information in the SDP. Also, frame delays may be notified to the playback terminal by indicating frame delay information in a scene description language such as a Synchronized Multimedia Integration Language (SMIL).

Also, frame delay information may be indicated on a random access by random access basis. Further, frame delay information may be indicated in the coded stream by, for example, adding it to the top picture in a random access unit RAU.

Frame delay information is indicated by management information in the multiplexed data to be outputted by the multiplexing apparatus in this way. Therefore, adjusting frame delays at the time of playing back the multiplexing data makes it possible to play back the coded stream without allowing the occurrence of a gap in display at the time of changing clips.

Second Embodiment

Figure 16:
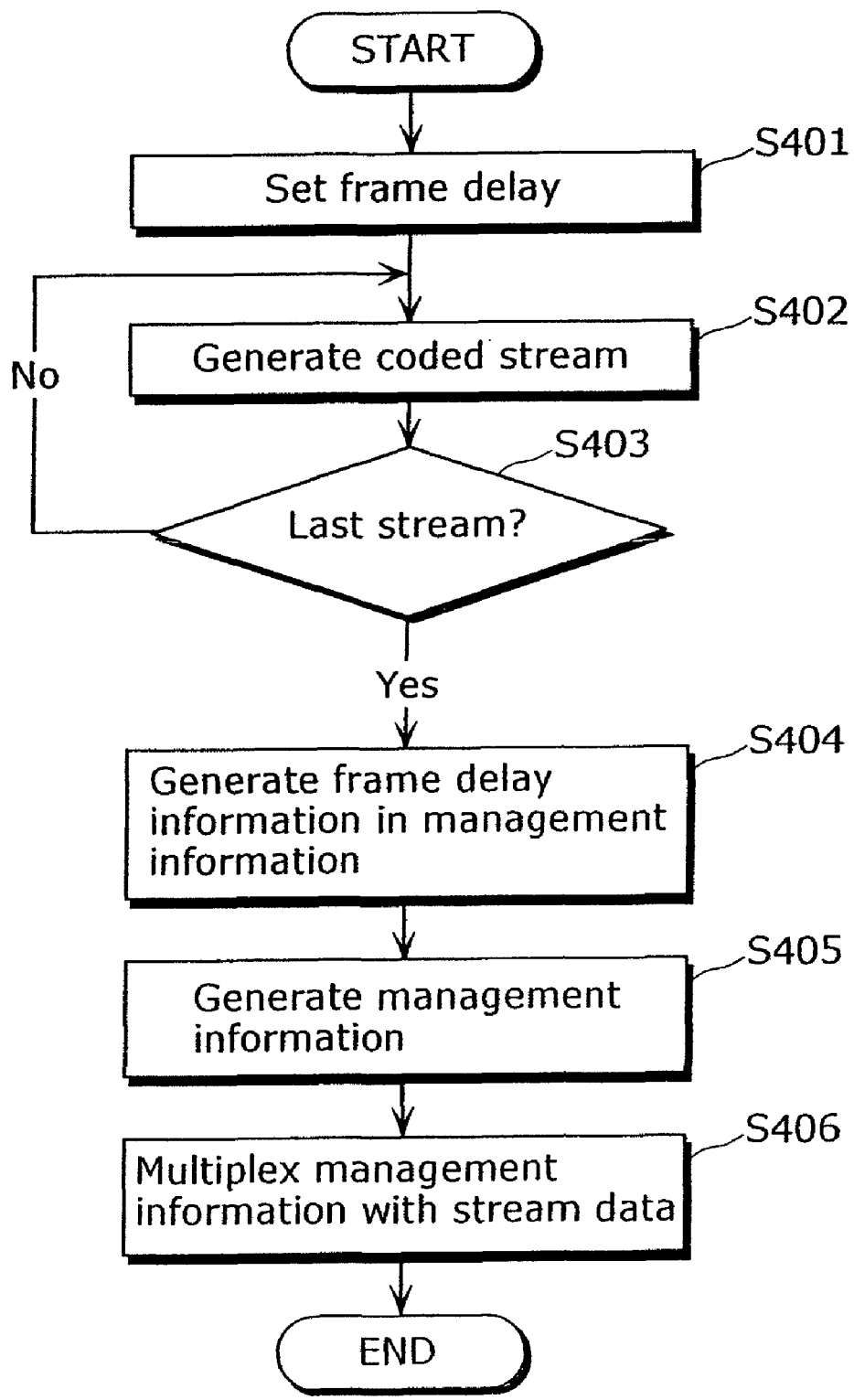
FIG. 16 is a flow chart showing the operation of the multiplexing apparatus in a second embodiment of the present invention.

FIG. 16 is a flow chart showing the operation of the multiplexing apparatus in a second embodiment of the present invention.

First, in Step 401, the multiplexing apparatus sets the value of frame delay used in common in the coded stream to be stored in the multiplexed data. In Step 402, it generates MPEG-4 AVC coded streams based on the frame delay that has been set in Step 401. In Step 403, it judges whether all the coded streams to be stored in the multiplexed data have already been generated, and repeats the processing of Step 402 until all the coded streams are coded. In Step 404, it generates frame delay information to be stored as management information of the multiplexed data, and then goes to Step 405. In Step 405, it generates management information indicating frame delay information in addition to the information generated by the conventional multiplexing apparatus. Lastly, in Step 406, it multiplexes the coded streams generated in Step 401 and the management information generated in Step 405 and then outputs the resulting multiplexed data.

Figure 17:
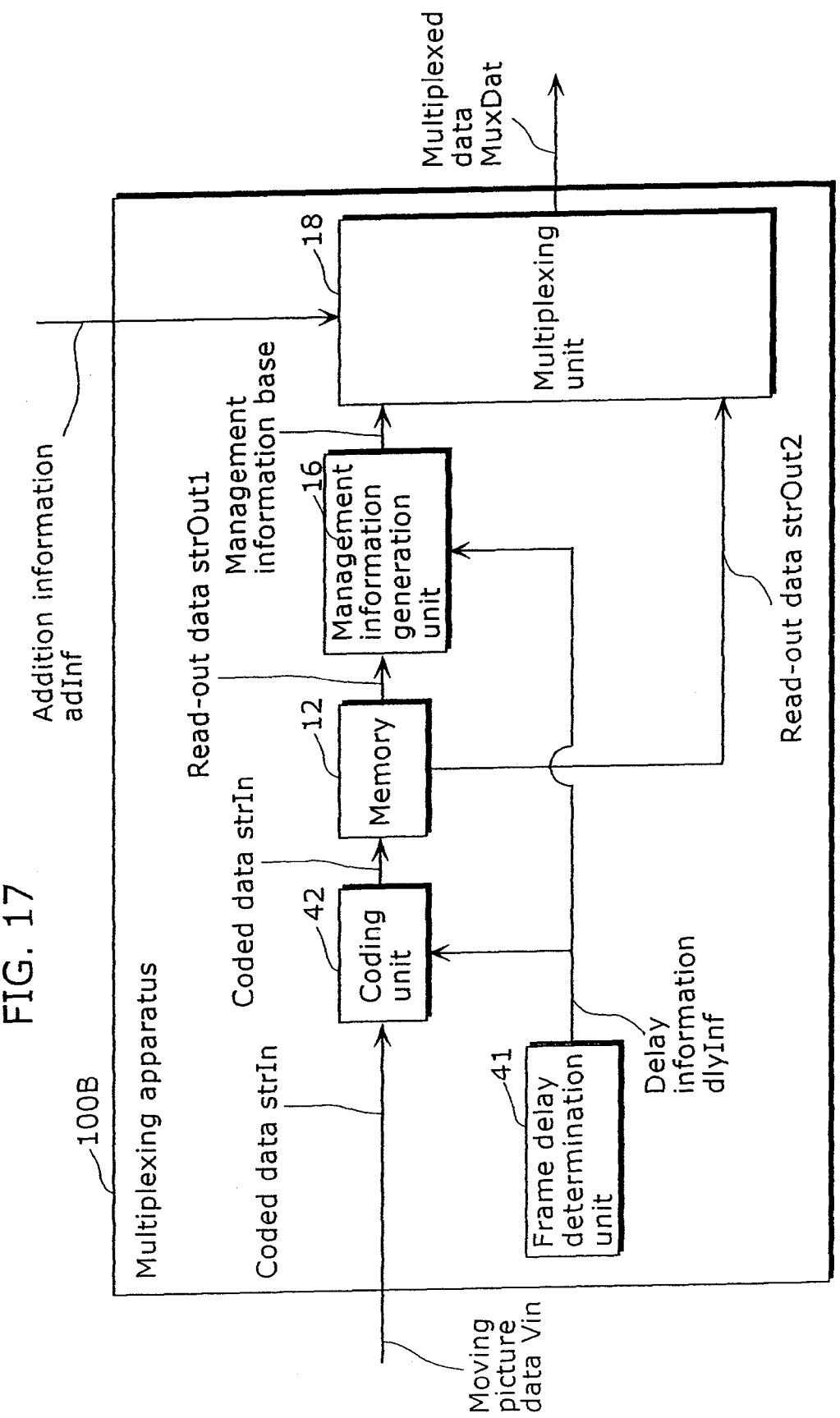
FIG. 17 is a block diagram of the multiplexing apparatus in the second embodiment of the present invention.

FIG. 17 is a block diagram showing the structure of the multiplexing apparatus in the second embodiment of the present invention.

The multiplexing apparatus 100B includes a frame delay determination unit 41, a coding unit 42, a memory 12, a management information generation unit 16 and a multiplexing unit 18.

Note that the same components of the above-described components of the multiplexing apparatus 100B of this embodiment as the conventional multiplexing apparatus shown in FIG. 8 are assigned the same reference numbers, and such components will not be described here again.

The frame delay determination unit 41 determines the frame delay of the coded stream and outputs delay information dlyInf to the coding unit 42 and the management information generation unit 16. The frame delay determined here may be the value predetermined by an application standard, or may be set for the multiplexing apparatus or by a user.

The coding unit 42 codes the inputted moving picture data Vin based on the frame delay indicated by delay information dlyInf, and then stores the coded data strIn into the memory 12. In other words, the coding unit 42 like this generates one or more coded data strIn making the frame delays in a unit of a random access unit equal to each other so that no gap occurs at the connection of these access units at the time when particular two access units, which are access units (coded data themselves or clips) included in one or more coded data strIn, are decoded in sequence. Note that to prevent the occurrence of a gap at the connection of these access units at the time of decoding means to prevent the occurrence of a gap in a display interval of pictures and prevent the occurrence of an overlap in a decoding interval of pictures.

The management information generation unit 16 generates management information base based on the analysis result of the coded data strOut1 read out from the memory 12 and delay information dlyInf, and then outputs the management information base to the multiplexing unit 18.

The multiplexing unit 18 multiplexes (i) management base, (ii) read out data strOut2 that has been read out from the memory 12 and (iii) addition information adInf, such as setting information by a user, which is obtained separately from the coded data, and then outputs the resulting multiplexed data MuxDat.

Note that, in the case where frame delay is previously defined by an application standard or the like, the multiplexing apparatus 100B may have the structure from which the frame delay determination unit 41 is excluded, and the coding unit 42 may perform coding processing based on a fixed frame delay instead. On condition that frame delays are invariable in a coded stream, it is possible to determine a frame delay at the time of playback without frame delay information included in management information. Therefore, there is no need to always indicate frame delay information in management information.

Since frame delays in the coded stream to be stored in the multiplexed data are invariable in this way in the case of multiplexed data outputted by the multiplexing apparatus, frame delays of respective clips are also invariable. Therefore, it is possible to play back coded streams with no gap in display without adjusting frame delays at the time of starting playback even in the case where clips are changed.

Note that a coding scheme other than the MPEG-4 AVC may be used in the above-described embodiments as long as it defines that frame delays are variable.

Also, the frame delays of these random access units (coded streams or clips) to be played back in sequence in seamless connection or seamless multi-angle playback may be made invariable. Here, seamless connection means to connect clips included in the same stream or different streams seamlessly. Also, seamless multi-angle playback means to connect clips, whose angles are different from each other, included in the coded streams and change these angles. For example, playback may be performed using an angle during the time period of the starting time up to $30^{th}$ second and selecting plural angles during the time period of $30^{th}$ second to $60^{th}$ second. At this time, each of the clips that shows a different angle has the same frame delay. Further, frame delay per angle may be made invariable irrespective of whether it is possible to perform multi-angle playback seamlessly. This is because the reproduction quality does not become invariable in the case where frame delays vary in a unit of an angle at the time of multi-angle playback. Note that such seamless connection or seamless multi-angle playback may be performed on the coded streams.

Note that each access unit used in seamless connection or multi-angle playback may be required to satisfy the following condition: an arbitrary picture in a first access unit can be decoded without the reference to a picture in a second access unit decoded earlier than the first access unit. An access unit like this corresponds to a closed GOP in the MPEG-2 or a random access unit RAU that starts with an IDR picture in the MPEG-4 AVC. Therefore, frame delays in the access units whose constituent pictures can be decoded referring to a picture within the same access units may be made invariable.

Also, in the case where frame delays of these access units to be played back in sequence in seamless connection or the like that are described above are made invariable, the multiplexing apparatus previously judges whether seamless connection or seamless multi-angle playback should be performed on these access units that should be generated. After that, in the case where the multiplexing apparatus judges that these access units should be the target, it performs coding so that frame delays of the target random access units are made to be equal to each other so as to generate a coded stream. For example, in the case where seamless connection or the like is performed on two coded streams, it generates the backward coded stream so that frame delays of the backward coded stream are made to be equal to the frame delays of the forward coded stream.

Also, the frame delay information included in the management information base may indicate that frame delays to particular access units (coded stream or clips) such as seamless connection are common. Also, it may be a flag indicating that the access unit may become a target of seamless connection, multi-angle playback or the like. The flag like this is stored in a play list, a time map or the like as the information indicating the attribute of connection.

Third Embodiment

Figure 18:
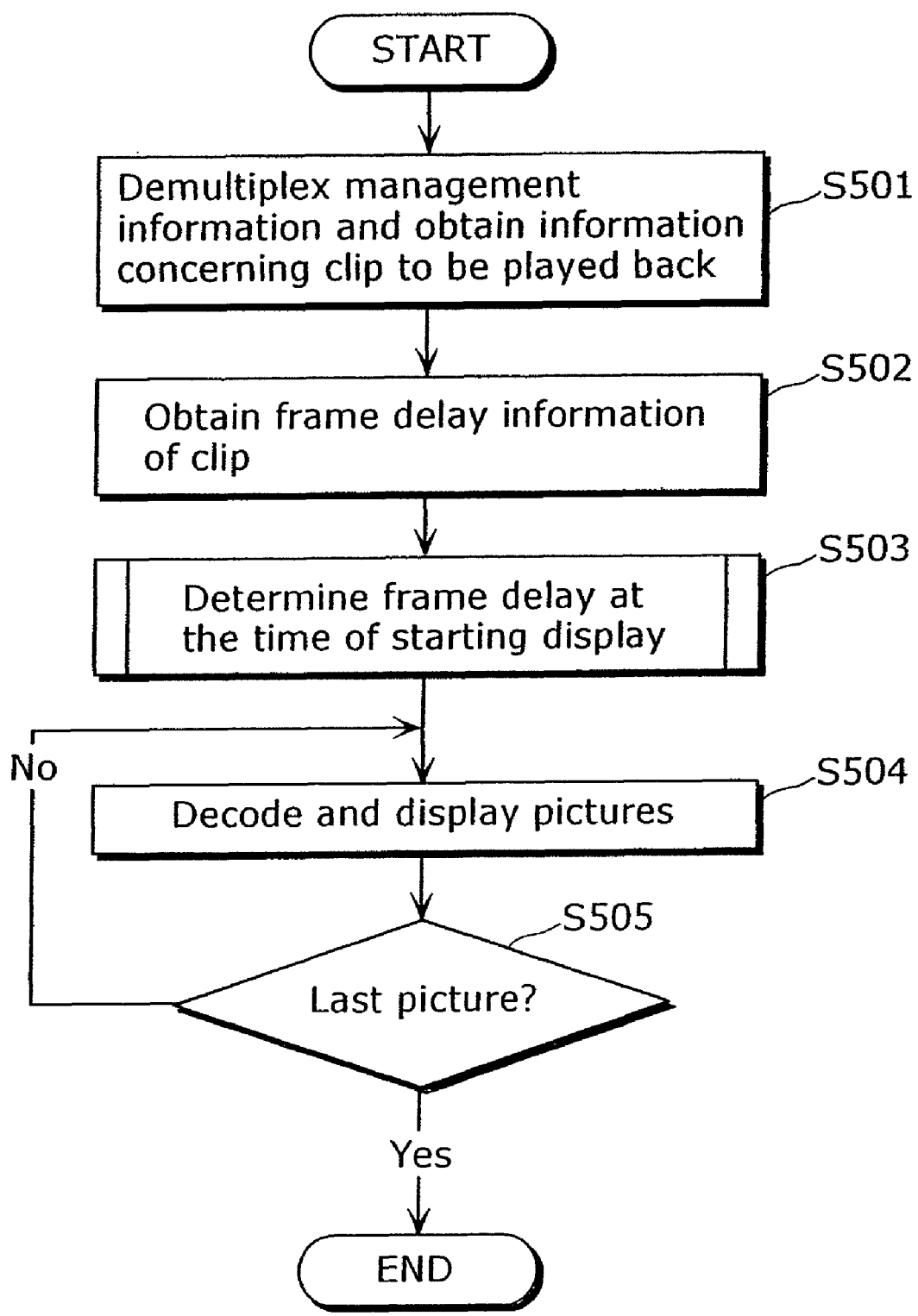
FIG. 18 is a flow chart showing the operation of the demultiplexing apparatus in a third embodiment of the present invention.

FIG. 18 is a flow chart indicating the operation of the demultiplexing apparatus in a third embodiment of the present invention. The demultiplexing apparatus inputs and plays back the multiplexed data generated by the demultiplexing apparatus in the first and second embodiments.

First, in Step 501, the demultiplexing apparatus demultiplexes the multiplexed data to obtain the management information, and obtains the information concerning the clips to be played back. Clips to be played back are determined based on the playback order predetermined by an instruction from a user or in a play list in the management information or the like.

Next, in Step 502, it obtains frame delay information of the clips determined as the clips to be played back in Step 501, and goes to Step 503. In Step 503, it determines the frame delay at the time of playing back the clips based on the frame delay information obtained in Step 502.

In Step 504 and Step 505, it decodes and displays the pictures in the clips up to the last pictures in the clips. Here, in the case where the completion of the playback is instructed through user operation, the playback is completed at the time when the instruction becomes valid. Note that frame delays may be determined only at the time of changing clips that belong to different coded streams, in Step 501 to Step 503.

Figure 19:
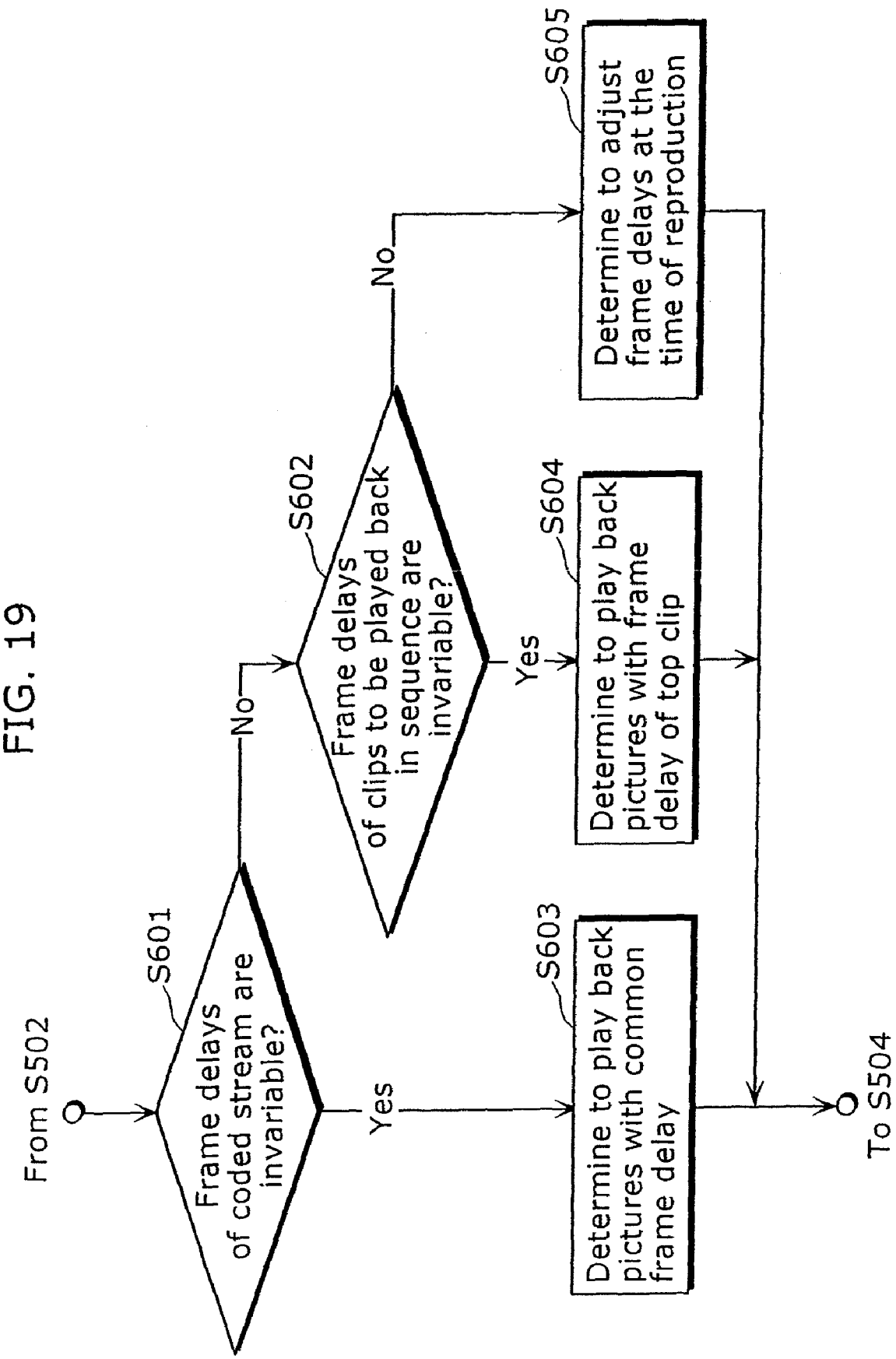
FIG. 19 is a flow chart showing the operation of the demultiplexing apparatus at the time of determining a frame delay in playback in the third embodiment of the present invention.

FIG. 19 is a flow chart showing the operation at the time of determining frame delays during playback in Step 503 of FIG. 18.

First, in Step 601, the demultiplexing apparatus judges whether or not frame delays of the coded streams stored in the demultiplexed data are invariable. In the case where frame delays are invariable, it goes to Step 603. In contrast, in the case where frame delays are variable, it goes to Step 602.

In Step 603, it determines to play back the coded streams in the multiplexed data with a common frame delay. In Step 602, it judges whether or not the frame delays of the clips to be played back in sequence are invariable. In the case where frame delays are invariable, it goes to Step 604. In contrast, in the case where frame delays are variable, it goes to Step 605. In Step 604, it determines to play back the coded streams based on the frame delay of the top clip in playback. In Step 605, it determines to adjust frame delays in playback. Available methods for adjusting frame delays in playback will be described below.

1. Adjusting to the maximum frame delay among the frame delays of clips to be played back.
2. Adjusting to the frame delay of the clip played back immediately before.
3. Using predetermined frame delay.

The first method is especially effective in the case where clips to be played back can be predetermined. The second method is especially effective in the case where clips to be played back are dynamically changed by a user instruction. Also, the third method is effective in the case where the maximum value of frame delays can be obtained from the management information of multiplexed data or the information in the coded stream or by an application standard. Further, frame delays predetermined for the apparatus may be used.

FIGS. 20C and 20D show the examples of the first and second methods respectively. FIG. 20C shows the example of playing back Clip 2 with a two-frame delay next to Clip 1 with a one-frame delay. Here, the frame delay at the time of playing back Clip 1 is two. FIG. 20D shows the example where changing to Clip 1 with a one-frame delay is instructed by a user while Clip 2 with a two-frame delay is being played back. At this time, the frame delay of Clip 1 is originally one, but it is played back on the premise that the frame delay of Clip 1 is two according to the frame delay of Clip 2. Determining the frame delay in this way makes it possible to play back a coded stream without allowing the occurrence of a gap in a display interval at the position where changing between Clip 1 and Clip 2 is performed.

Note that there may be a case where frame delay information is not shown in the demultiplexing data when frame delays of the coded stream in multiplexed data are equal to each other, as shown in the second embodiment. The processing of Step 502 is unnecessary in the case of playing back multiplexed data like this. Also, it is preferable to adjust to the frame delay of the top clip in playback also in the case of determining the frame delay at the time of starting display in Step 503.

Also, the demultiplexing apparatus may always play back the multiplexed data based on the predefined maximum value in the case where the maximum value of frame delays is defined by an application standard or the like.

Figure 21:
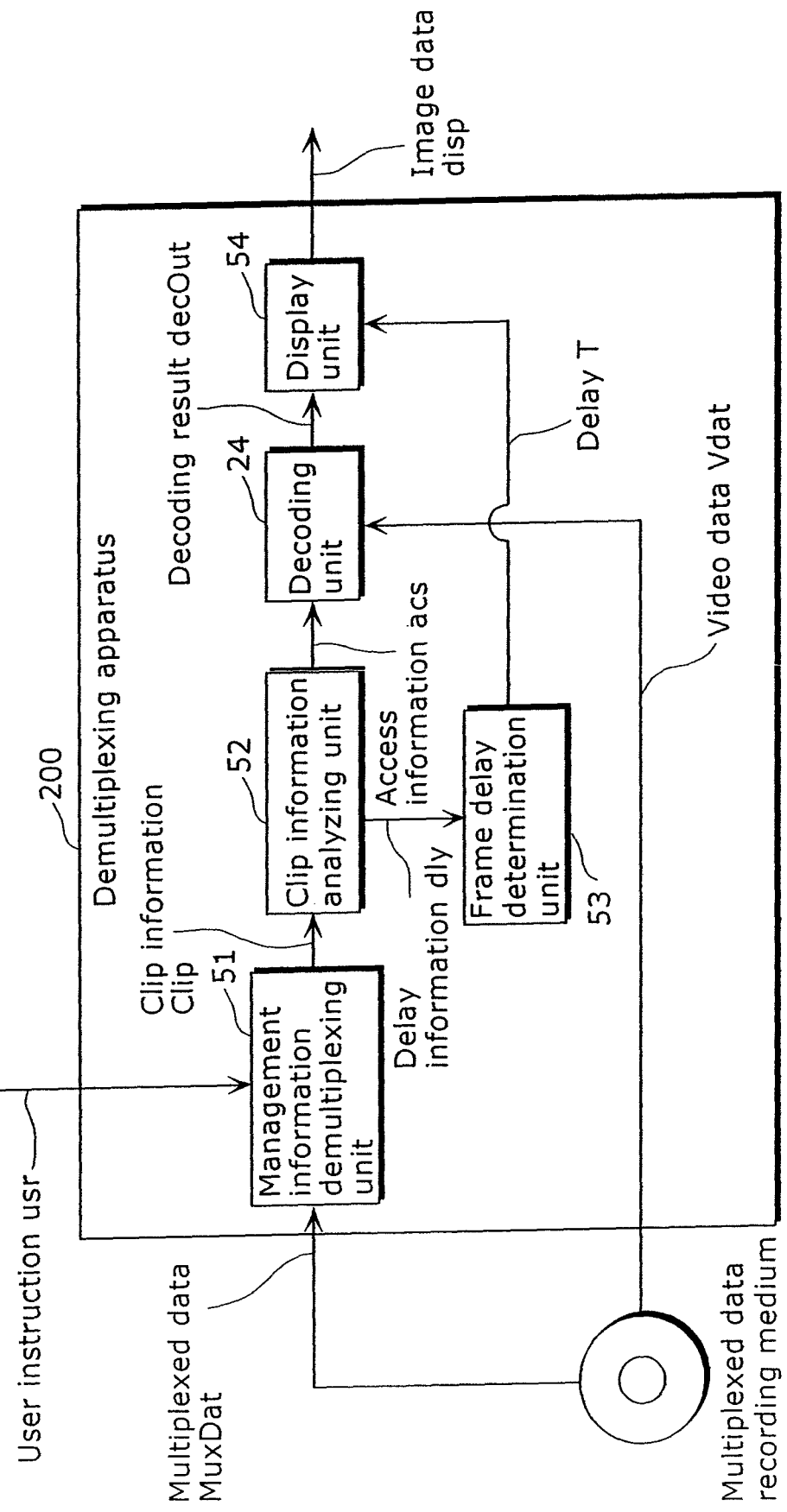
FIG. 21 is a block diagram showing the demultiplexing apparatus in the third embodiment of the present invention.

FIG. 21 is a block diagram showing the structure of the demultiplexing apparatus of a third embodiment.

The demultiplexing apparatus 200 includes a management information demultiplexing unit 51, a clip information analysis unit 52, a frame delay determination unit 53, a decoding unit 24 and a display unit 54.

The management information demultiplexing unit 51 reads out multiplexed data MuxDat from a multiplexed data recording medium such as an optical disc, analyzes the management information and determines the clips to be played back according to a user instruction or a predetermined method. After that, the management information demultiplexing unit 51 outputs clip information Clip that is the information concerning the determined clips, to the clip information analysis unit 52.

The clip information analysis unit 52 outputs access information acs used for accessing the pictures that constitute clips to the decoding unit 24. Further, the clip information analysis unit 52 obtains delay information dly of the clips to be played back and outputs it to the frame delay determination unit 53.

The decoding unit 24 reads out video data Vdat from a multiplexed data recording medium based on the access information acs, decodes the video data Vdat, and then outputs the decoding result decOut to the display unit 54.

The frame delay determination unit 53 determines frame delay at the time of playback, and outputs delay T to the display unit 54.

The display unit 54 displays the pictures according to delay T. Note that there may be a case where frame delay information is not shown in the multiplexed data in the case where frame delays of the coded stream in the multiplexed data are equal to each other, as shown in the second embodiment. The demultiplexing apparatus may have the structure from which the frame delay determination unit 53 is excluded in the case of playing back multiplexed data like this.

Also, a frame delay at a connection may be variable in the case where seamless connection is not guaranteed although a frame delay of a continuous playback unit shown in a play list or the like is invariable at the time when seamless connection or multi-angle playback is performed on these access units. In the case where management information of multiplexed data does not include information indicating a frame delay at this time, the frame delay of the access unit may be obtained in the decoding unit 24 and the obtained frame delay may be inputted into the frame delay determination unit 53. Here, in the playback area where frame delay is invariable, the frame delay is determined according to the frame delay of the top access unit in a playback order. In contrast, in the playback area where frame delay is variable, the frame delay determination unit adjusts the frame delay at the time of playback. Note that it is possible to apply the same frame delay as the maximum value of the frame delay determined in an application standard or the like in any above-described cases.

Fourth Embodiment

Functions such as multi-angle playback and digest playback are especially important to optical disc apparatuses for playing back package media. Here will be described an example where multiplexed data outputted from the multiplexing apparatuses in the first and second embodiments are recorded into a Blu-ray Disc (BD) that is a next generation optical disc.

First, a recording format of a BD-ROM will be described.

Figure 22:
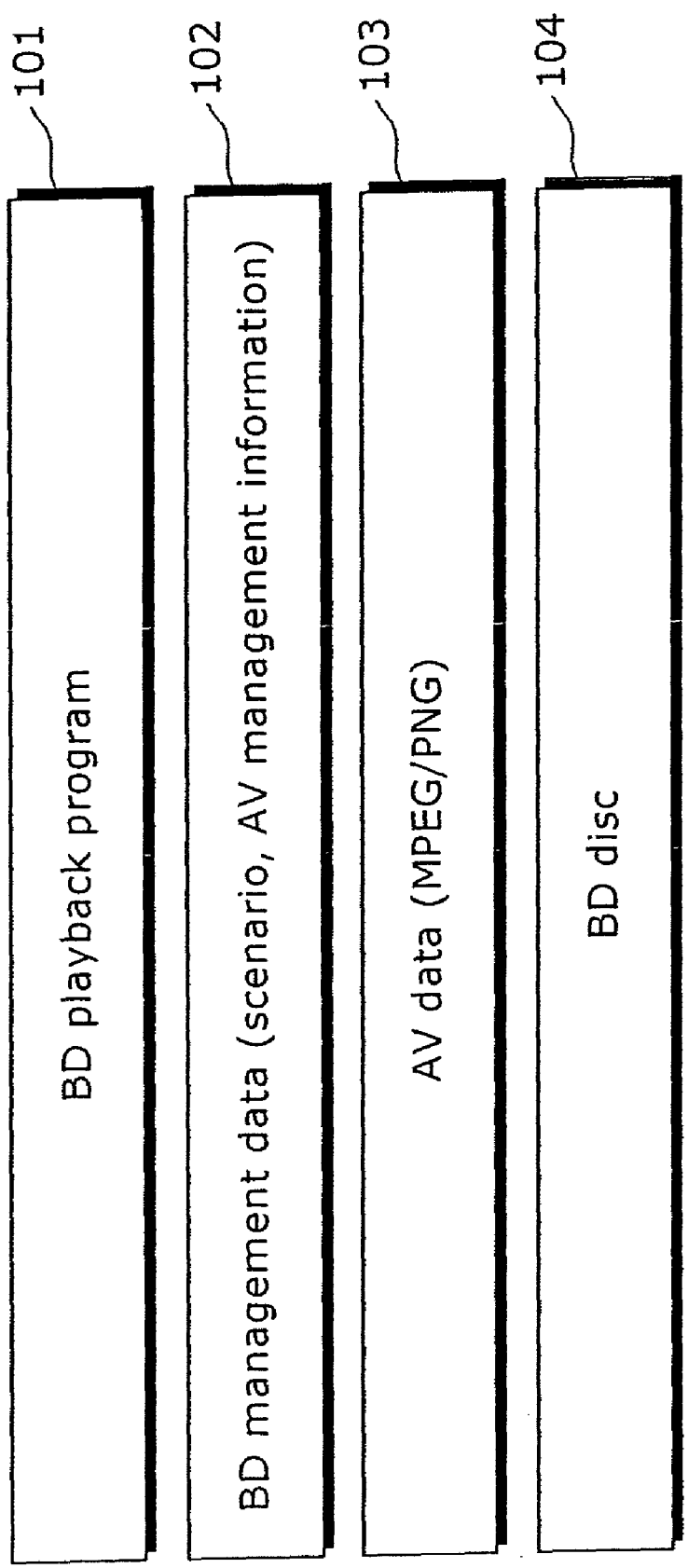
FIG. 22 is a diagram showing the data hierarchy of an HD-DVD.

FIG. 22 is a diagram indicating the structure of the BD-ROM, especially the structures of a BD disc 104 that is a disc medium, and data stored in the disc. The data stored in the BD disc 114 includes AV data 103, BD management information 102 such as management information concerning the AV data and an AV playback sequence, and a BD playback program 101 that realizes interactivity. Here, as a matter of convenience, the description of the BD disc will be made focusing on the AV application for playing back audio and visual contents of movies, but similar description can be made focusing on other use.

Figure 23:
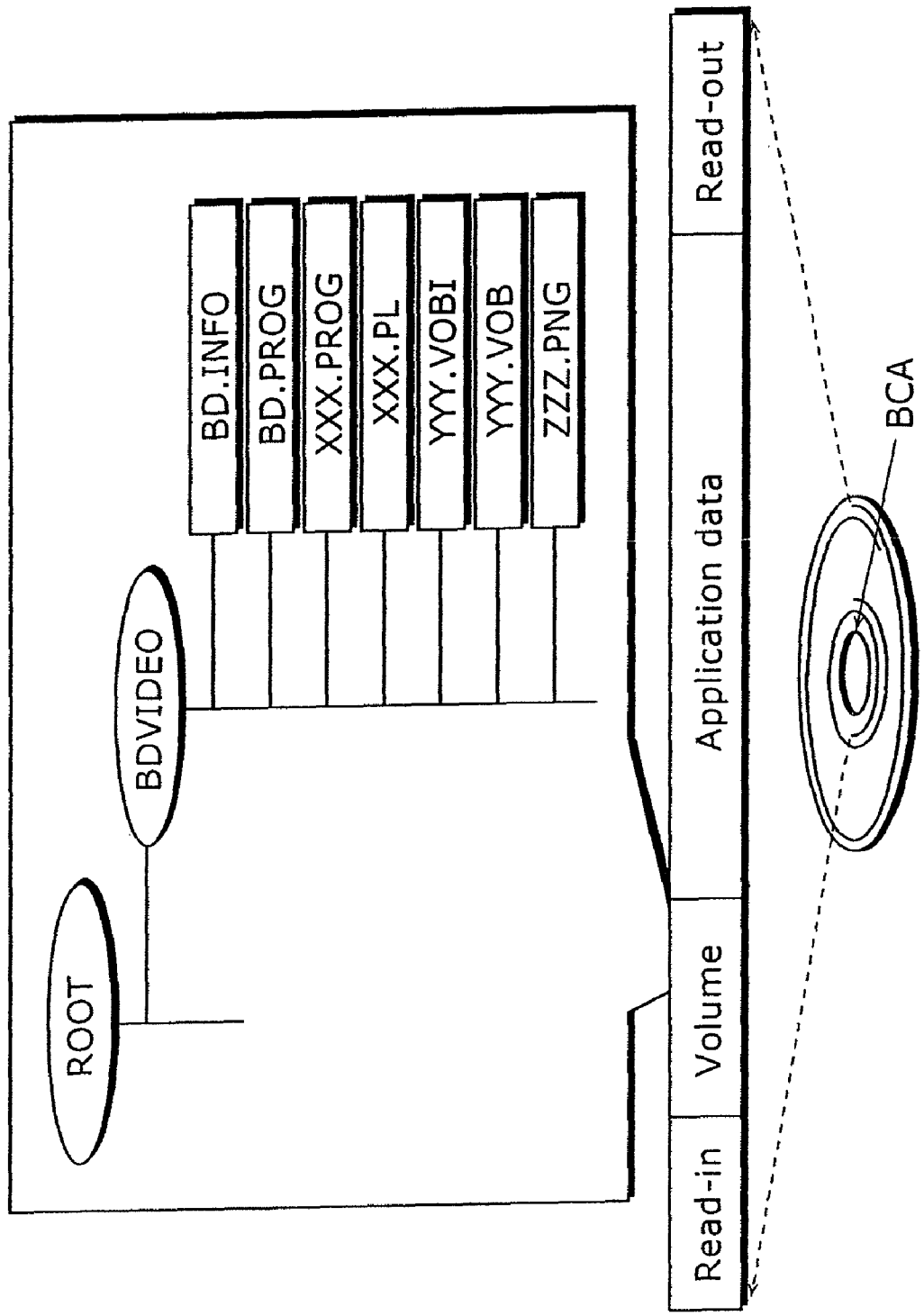
FIG. 23 is a diagram showing the structure of the logical space of an HD-DVD.

FIG. 23 is a diagram showing the structure of a directory file of logical data stored in the above-described BD disc. A BD disc has a recording area from its inner radius to its outer radius like, for example, a DVD, a CD and the like, and has logical address space for storing logical data between the read-in at the inner radius and the read-out at the outer radius. Also, inside the read-in, there is a special area that can be read out only by a drive called a Burst Cutting Area (BCA). As this area cannot be read out from application, it may be used for, for example, copy right protection technique.

File system information (volume) is stored in the top of the logical address space, and application data such as video data is also stored there. As described in the background art, a file system is, for example, the UDF or the ISO9660, and it enables reading out the logical data stored using a directory structure or a file structure like in the case of a normal PC.

In this embodiment, as the directory structure and the file structure on the BD disc, the BDVIDEO directory is placed immediately below a route directory (ROOT). This directory is a directory storing data such as AV contents or management information (101, 102 and 103 that are described in FIG. 22) that is handled in the BD.

Below the BDVIDEO directory, the following seven files are recorded.

(i) BD. INFO (the file name is fixed) which is an item of "BD management information" and is a file storing the information concerning the whole BD disc. The BD player reads out this file first.

(ii) BD. PROG (the file name is fixed) which is one of "BD playback programs" and is a file storing the playback control information concerning the whole BD disc.

(iii) XXX. PL ("XXX" is variable, and the extension "PL" is fixed) which is an item of "BD management information" and is a file storing the play list information that is a scenario (playback sequence). Each play list has a file.

(iv) XXX. PROG ("XXX" is variable, and the extension "PROG" is fixed) which is one of "BD playback programs" and is a file storing the playback control information prepared on the play list basis. The corresponding play list is identified based on a file body name (based on a matching of "XXX").

(v) YYY. VOB ("YYY" is variable, and the extension "VOB" is fixed) which is one of "AV data" and is a file storing the VOB (the same as the VOB described in the background art). Each VOB has a file.

(vi) YYY. VOBI ("YYY" is variable, and the extension "VOBI" is fixed) which is an item of "BD management information" and is a file storing the stream management information concerning the VOB that is the AV data. The corresponding play list is identified based on a file body name (based on a matching of "YYY").

(vii) ZZZ. PNG ("ZZZ" is variable, and the extension "PNG" is fixed) which is one of "AV data" and is a file storing image data PNG (that is a picture format standardized by the W3C and called "ping") for constituting subtitles and menus. Each PNG image has a file.

The structure of BD navigation data (BD management information) will be described with reference to FIG. 24 to FIG. 29.

Figure 24:
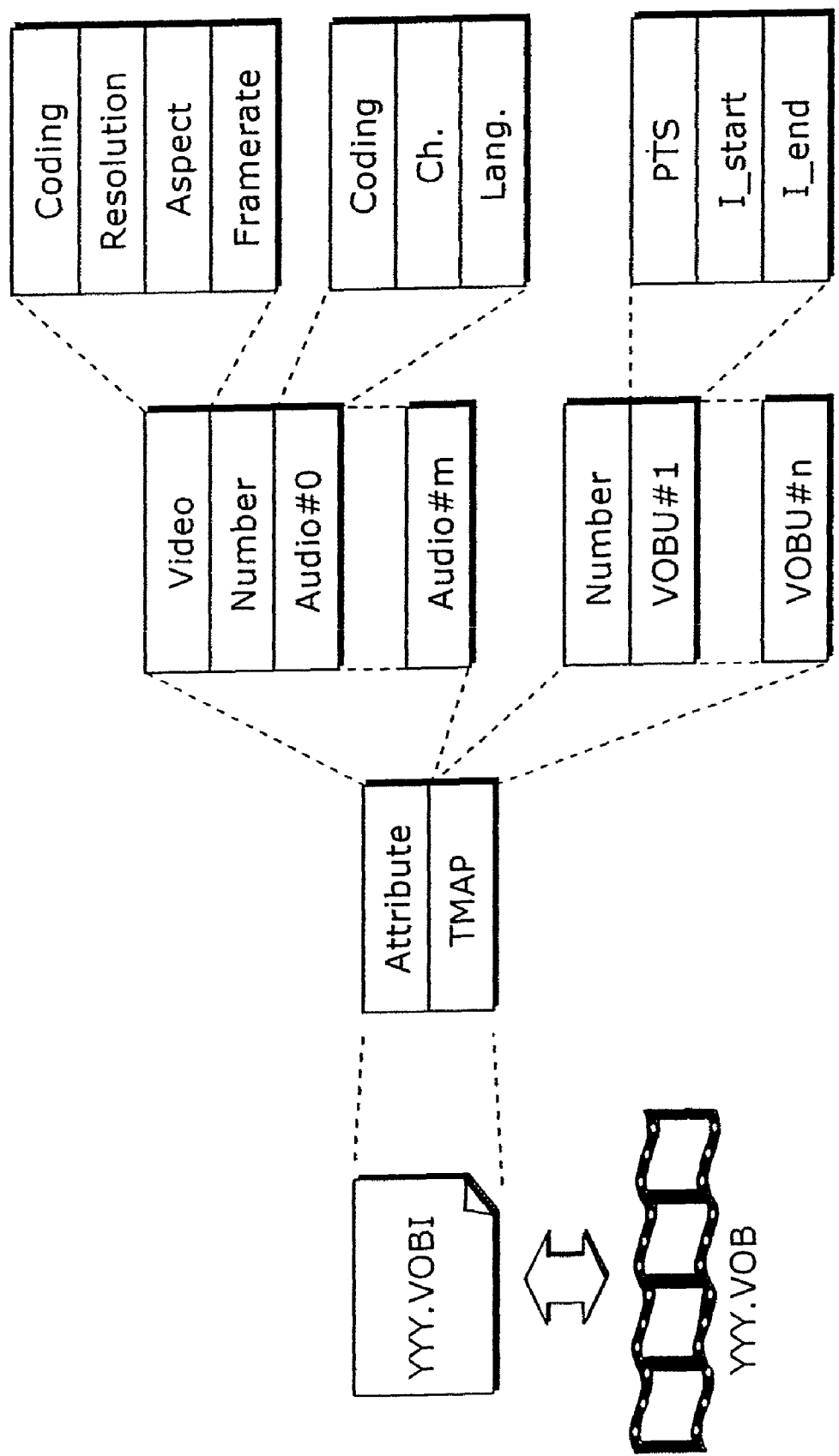
FIG. 24 is a diagram showing the structure a VOB information file.

FIG. 24 is a diagram showing the internal structure of a VOB management information file ("YYY. VOBI").

The VOB management information has the stream attribute information (Attribute) of the VOB and a time map (TMAP). The stream attribute has video attribute (Video) and audio attribute (Audio#0 to Audio#m) separately. Especially in the case of audio stream, as a VOB has plural audio streams at the same time, the presence or absence of a data field is indicated by the number (Number) of audio streams.

The following are video attributes (Video) stored in fields respectively and the values that the respective fields may have.

(i) compression format (Coding): MPEG-1; MPEG-2; MPEG-4; and MPEG-4 AVC (Advanced Video Coding).

(ii) resolution (Resolution): 1920×1080; 1440×1080; 1280×720; 720×480; and 720×565.

(iii) aspect ratio (Aspect): 4 to 3; and 16 to 9.

(iv) frame rate (Framerate): 60; 59.94 (60/1.001); 50; 30; 29.97 (30/1.001); 25; 24; and 23.976 (24/1.001).

The following are audio attributes (Audio) stored in fields respectively and the values that the respective fields may have.

(i) compression format (Coding): AC3; MPEG-1; MPEG-2; and LPCM.

(ii) the number of channels (Ch): 1 to 8

(iii) language attribute (Language):

The time map (TMAP) is a table for storing the information on a VOBU basis, and has the number of VOBUs that the VOB has and the respective items of VOBU information (VOBU#1 to VOBU#n). The respective items of VOBU information include I_start that is the address (the starting address of an I picture) of the top TS packet of a VOBU and an offset address (I_end) up to the end address of the I picture, and the playback starting time (PTS) of the I picture.

Figure 25:
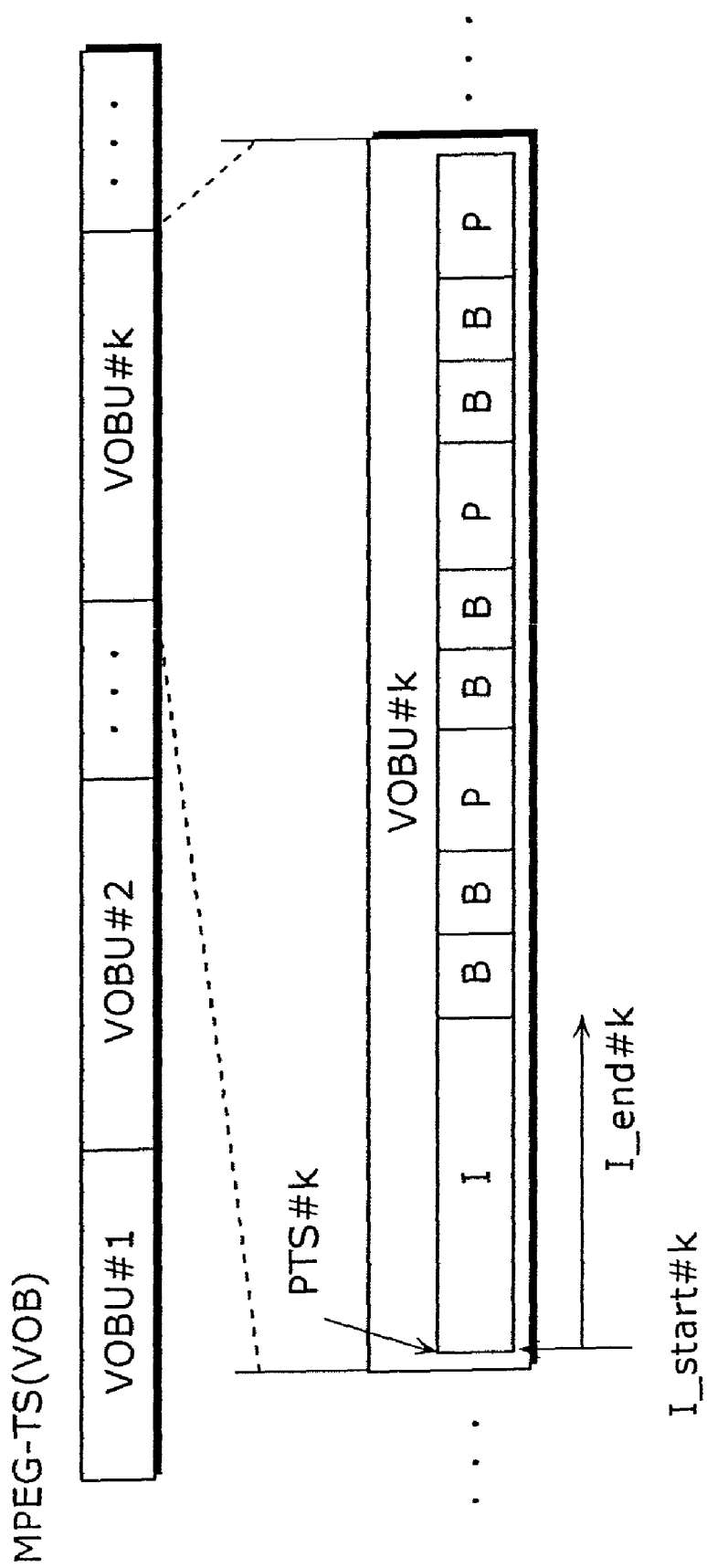
FIG. 25 is an illustration of a time map.
Figure 26:
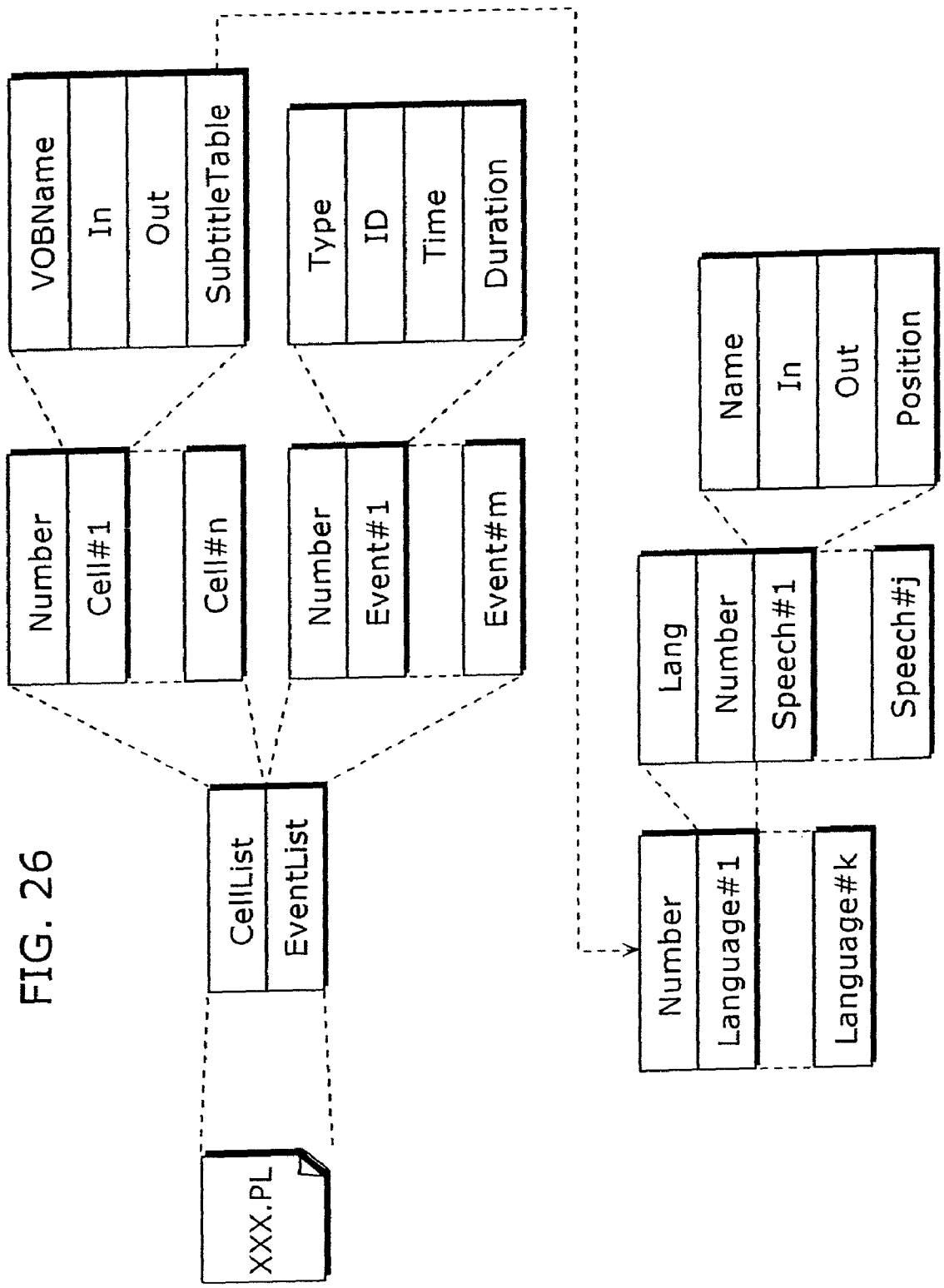
FIG. 26 is a diagram showing the structure of a play list file.

FIG. 25 is a diagram illustrating the details of the VOBU information.

As widely known, as variable bit rate compression may be performed on the MPEG video stream in order to record the video stream in high quality, there is no proportionality between the playback time and the data size. On the other hand, as a fixed bit rate compression is performed in the AC3 that is an audio compression standard, the relationship between the time and the address can be obtained from a primary expression. However, in the case of MPEG video data, each frame has a fixed display time, for example, a frame has display time of 1/29.97 seconds in the case of NTSC, but the data size after compressing each frame changes greatly depending on the image feature, or the picture type used in the compression, such as an I picture, a P picture or a B picture. Therefore, in the case of an MPEG video stream, it is impossible to represent the relationship between the time and the address using a primary expression.

As might be expected, it is impossible to represent the relationship between the time and the data size using a primary expression in an MPEG system stream where MPEG video data is multiplexed, that is, a VOB. Therefore, a time map (TMAP) associates the time with the address in a VOB.

In this way, in the case where time information is given, the VOBU to which the time belongs to is searched first (by following PTSs of VOBUs in order), the PTS immediately before the time is jumped into the VOBU that a TMAP has (the address specified by I_start), decoding is started with the top I picture of the VOBU, and display is started with the picture corresponding to the time.

Next, the internal structure of a play list information ("XXX. PL") will be described with reference to FIG. 26.

The play list information includes a cell list (CellList) and an event list (EventList).

The cell list (CellList) is a playback cell sequence in the play list, and cells are played back in the description order indicated in this list. The contents of the cell list (CellList) is the number of cells (Number) and the information of each cell (Cell#1 to Cell#n).

The cell information (Cell#) has a VOB file name (VOB-Name), starting time (In) and end time (Out) in the VOB, and subtitles (SubtitleTable). The starting time (In) and the end time (Out) are represented as a frame number in each VOB. It is possible to obtain the address of the VOB data needed for playback by using the above-described time map (TMAP).

The subtitle table (SubtitleTable) is a table storing subtitle information that is played back synchronously with the VOB. Like in the case of audio, plural languages are included in subtitles. The first information of the subtitle table (SubtitleTable) includes the number of languages (Number) and the following tables (Language#1 to Language#k) prepared in a unit of a language.

Each language table (Language#) includes language information (Lang), the number (Number) of items of subtitle information of subtitles to be displayed separately, and subtitle information (Speech#1 to Speech#j) of subtitles to be displayed separately. The subtitle information (Speech#) includes an image data file name (Name), subtitle display starting time (In), subtitle display ending time (Out) and a subtitle display position (Position).

The event list (EventList) is a table defining each event that occurs in the play list. The event list includes the number of events (Number) and respective events (Event#1 to Event#m). Each event (Event#) includes an event type (Type), an event ID (ID), an event occurrence time (Time) and an event duration (Duration).

Figure 27:
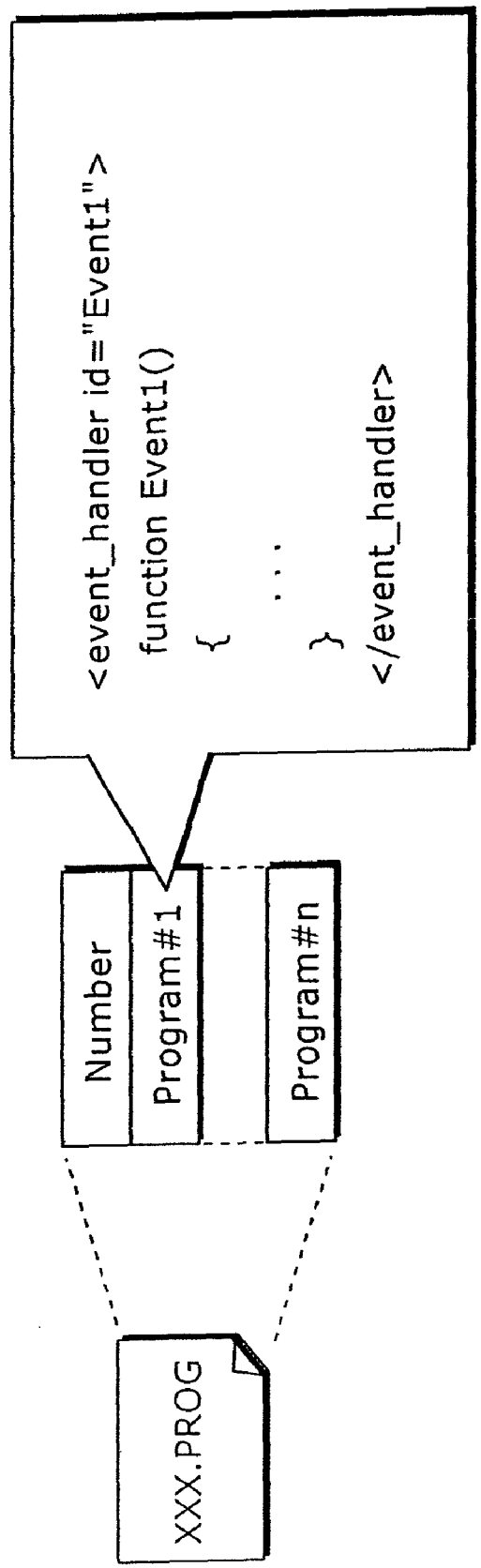
FIG. 27 is a diagram showing the structure of a program file corresponding to a play list.
Figure 28:
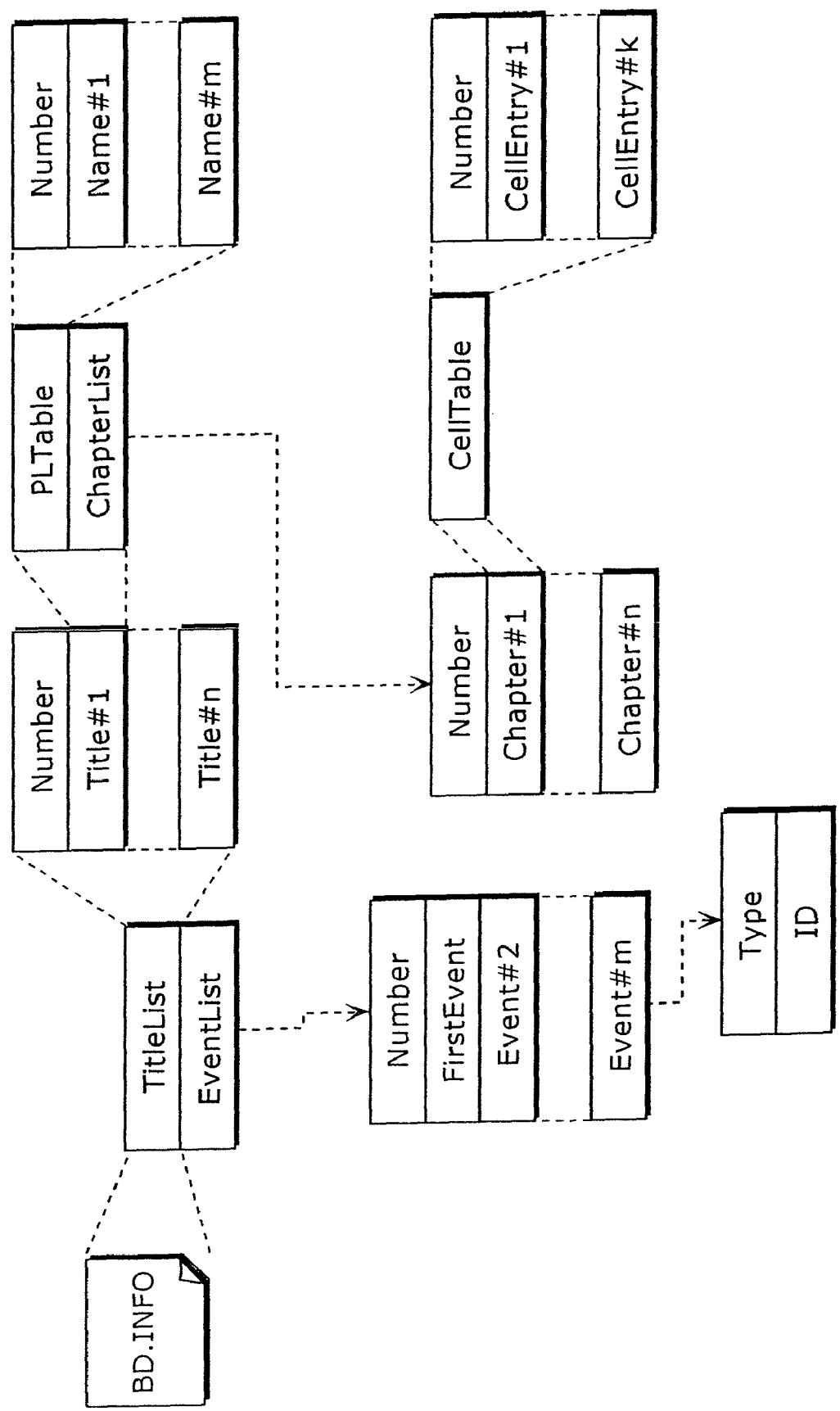
FIG. 28 is a diagram showing the structure of a BD disc management information file.

FIG. 27 is an event handler table ("XXX. PROG") having an event handler (that is a time event and a user event for menu selection) prepared on a play list basis.

The event handler table includes the number of defined event handlers/programs (Number) and the respective event handlers/programs (Program#1 to Program#n). The contents of each event hander/program (Program#) is the definition of the start of an event handler (<event_handler> tag) and the event hander ID (ID) that is paired with the earlier described event ID, and next to it, the program described in "{ }" that follows Function. The event (Event#1 to Event#m) stored in the event list (EventList) of the earlier-described "XXX. PL" is specified using an ID (ID) of the event handler of "XXX. PROG".

Next, the internal structure of the information concerning the whole BD disc ("BD. INFO") will be described with reference to FIG. 28.

The information concerning the whole BD disc includes a title list (TitleList) and an event table for global event (EventList).

The title list (TitleList) includes the number of titles of a disc (Number) and items of title information (Title#1 to Title#n) that follows the number of titles. The respective items of title information (Title#) include a play list table included in the title (PLTable) and a chapter list in the title (ChapterList). The play list table (PLTable) includes the number of play lists in the title (Number) and play list names (Name) that are the file names of play lists.

The chapter list (ChapterList) includes the number of chapters included in the title (Number) and items of chapter information (Chapter#1 to Chapter#n). Each item of chapter information (Chapter#) includes a cell table (CellTable) included in the chapter, and the cell table (CellTable) includes the number of cells (Number) and items of cell entry information (CellEntry#1 to CellEntry#k). The cell entry information (CellEntry#) includes the play list name including the cell and a cell number in the play list.

The event list (EventList) includes the number of global events (Number) and items of global event information. It should be noted that the global event to be defined first is called first event (FirstEvent), and is the event called first after the BD disc is inserted into a player. The event information for global event has only an event type (Type) and an event ID (ID).

Figure 29:
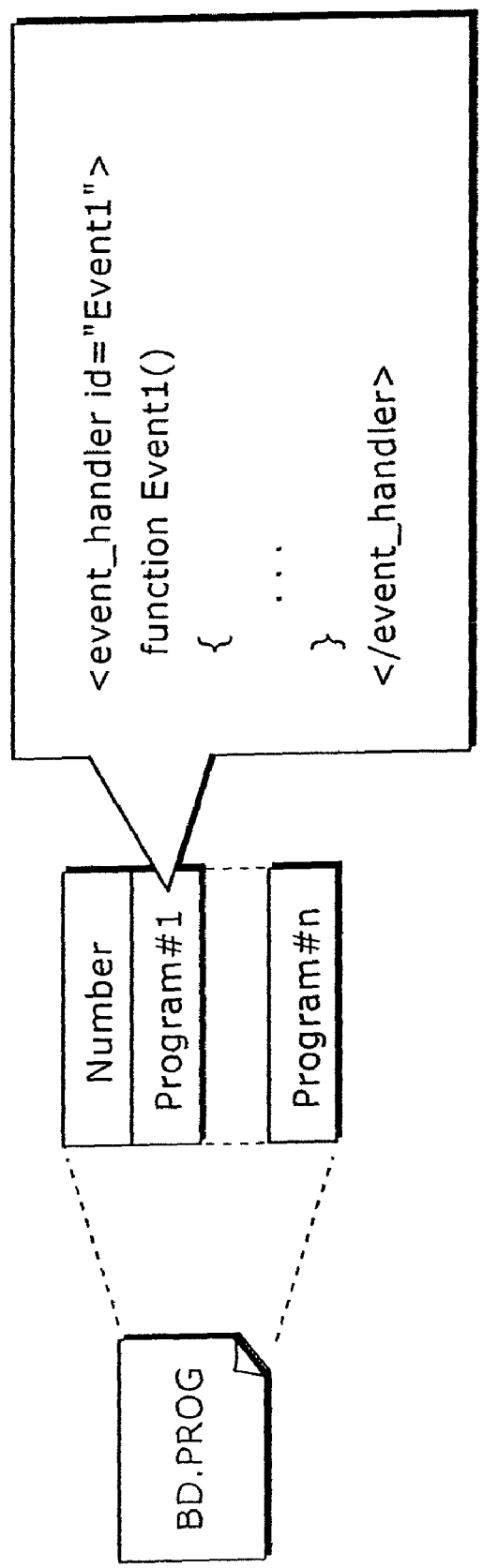
FIG. 29 is a diagram showing the structure of a program file for recording a global event handler.

FIG. 29 is a table ("BD. PROG") of a program of a global event handler. The contents of this table is the same as the contents of the event handler table described in FIG. 27.

In the case of multiplexing output data of the multiplexing apparatuses in the first and second embodiments using the BD-ROM format like above, a VOBU is made up of one or more random access unit RAUs, and the playback order of the clips are specified in a play list. Here, frame display information can be shown by BD management information. For example, frame delay information may be stored in play items of a play list, or a table indicating access information such as an EP map. Also, frame delay information may be stored in a table indicating the attribute information of the coded stream. Further, in the case of indicating (i) the maximum value of frame delays of the coded stream to be stored in the multiplexed data, (ii) frame delay common among all the coded streams, or the like, frame delays may be indicated as the information higher than the information concerning the respective coded streams.

Note that the playback order of clips may be determined based on the information different from the play list or a predetermined order.

Note that the access information such as EP map may be stored in a table as binary data, or in the form of text data which may be an XML (Extensible Markup Language) and the like.

Fifth Embodiment

Figure 30:
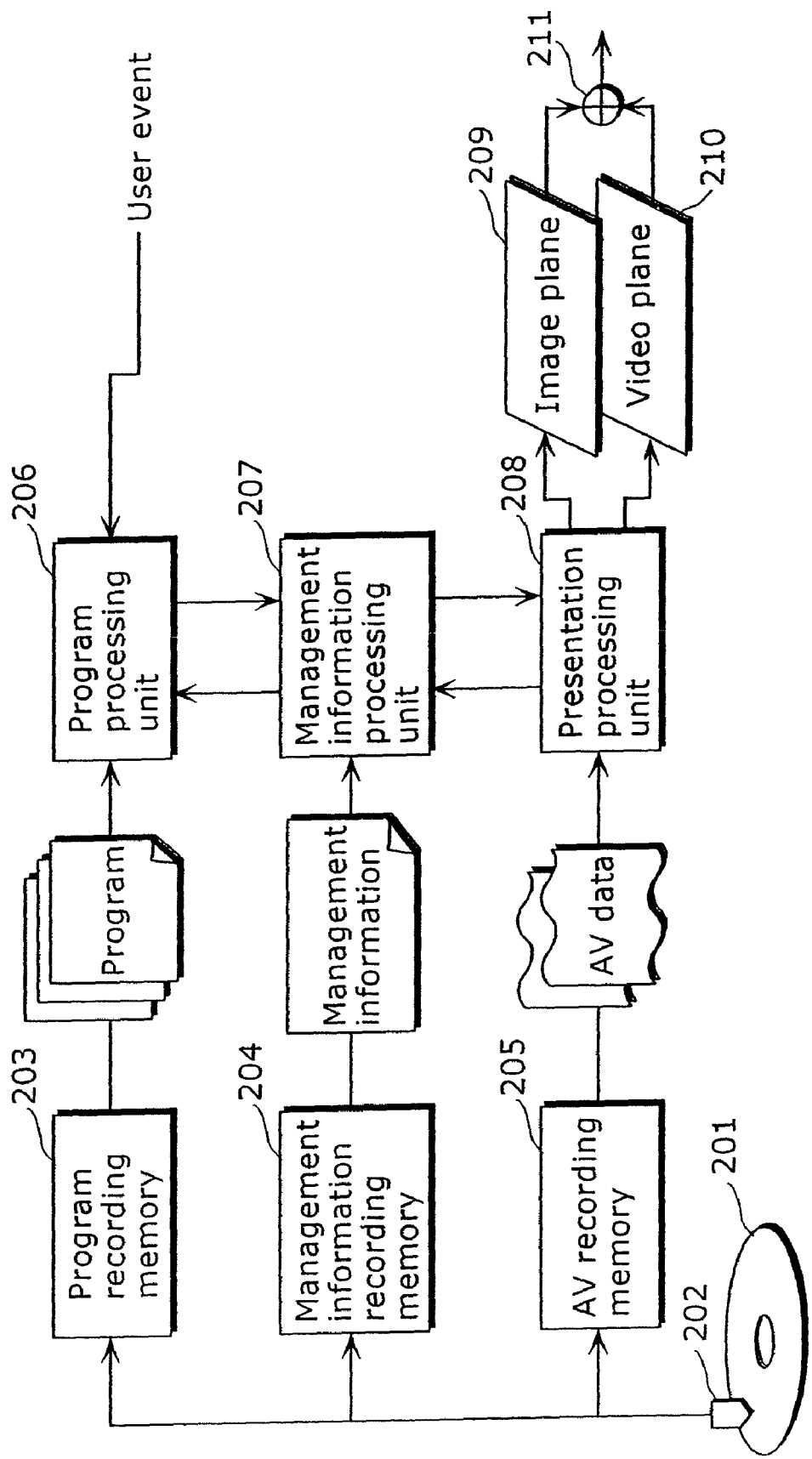
FIG. 30 is a block diagram showing the outline structure of an HD-DVD player.

FIG. 30 is a block diagram roughly showing the functional structure of a player that plays back a BD disc concerning a fifth embodiment.

The data on the BD disc 201 is read out through an optical pick up 202. The read out data is transmitted to an exclusive memory depending on the types of the respective data. The BD playback program (the contents of "BD. PROG" or "XXX. PROG") is transmitted to a program memory 203. Also, the BD management information ("BD. INFO", "XXX. PL" or "YYY. VOBI") is transmitted to a management information memory 204. Also, the AV data ("YYY. VOB" or "ZZZ. PNG") is transmitted to an AV memory 205.

The BD playback program recorded in the program memory 203 is processed by a program processing unit 206. Also, the BD management information recorded in the management information memory 204 is processed by the management information processing unit 207. Also, the AV data recorded in the AV memory 205 is processed by a presentation processing unit 208.

The program processing unit 206 receives the information of play lists to be played back by the management information processing unit 207 and the event information such as the execution timing of the program and performs the processing of the program. Also, it is possible to dynamically change the play lists to be played back by the program. This can be realized by sending a playback instruction of the play lists to the management information processing unit 207. The program processing unit 206 receives an event from a user, in other words, receives a request through a remote controller, and in the case where there is a program corresponding to the user event, it executes the program.

The management information processing unit 207 receives an instruction from the program processing unit 206, analyzes the play lists and the management information of the VOBs corresponding to the play lists, and instructs the presentation processing unit 208 to play back the target AV data. Also, the management information processing unit 207 receives the standard time information from the presentation processing unit 208, instructs the presentation processing unit 208 to stop playing back the AV data based on the time information. Also, the management information processing unit 207 generates an event to notify the program processing unit 206 of the program execution timing.

The presentation processing unit 208 has a decoder that can process video, audio, subtitles/images (still pictures) respectively. It decodes and outputs the AV data according to an instruction from the management information processing unit 207. In the case of video data, and subtitles/images, they are decoded and then rendered in the respective exclusive planes, that is, the video plane 210 and the image plane 209. After that, the synthesis processing unit 211 performs the synthesis processing on the video, and outputs the video to a display device such as a TV.

The presentation processing unit 208 interprets the user operation requesting for multi-angle playback or digest playback at the time of multi-angle playback or digest playback, and notifies the management information processing unit 207 of the information concerning an angle changeable point or the like. The management information processing unit 207 determines frame delay at the time of playback based on the frame delay information of the clips to be played back, and notifies the presentation processing unit of the frame delay.

Note that access information such as an EP map may be stored in a table as a binary data and may also be in a text format such as an Extensible Markup Language (XML).

Sixth Embodiment

Further, it becomes possible to easily execute the processing shown in the respective embodiments in an independent computer system, by recording the program for realizing the multiplexing method and the demultiplexing method shown in the above-described embodiments into a recording medium such as a flexible disc.

Figure 31A:
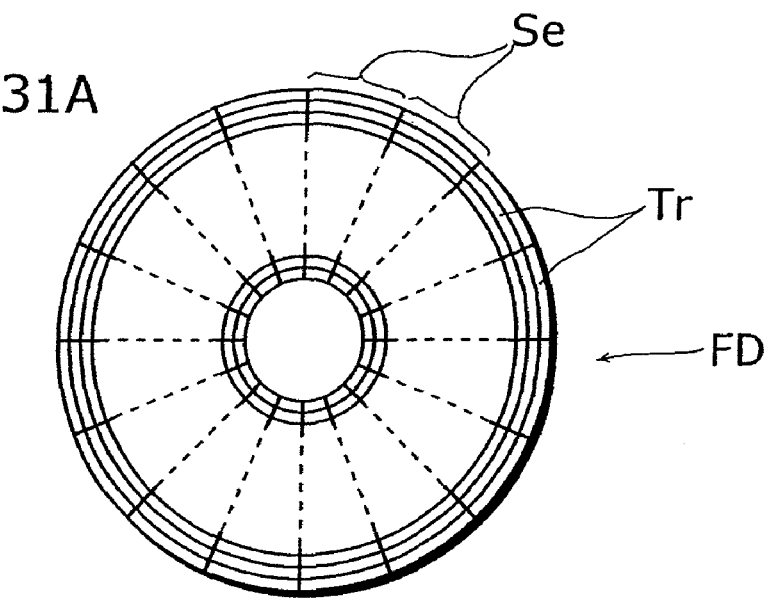
FIGS. 31A and 31B are illustrations showing the structure of a recording medium on which the program for realizing the multiplexing method and the demultiplexing method of the present invention are recorded.
Figure 31B:
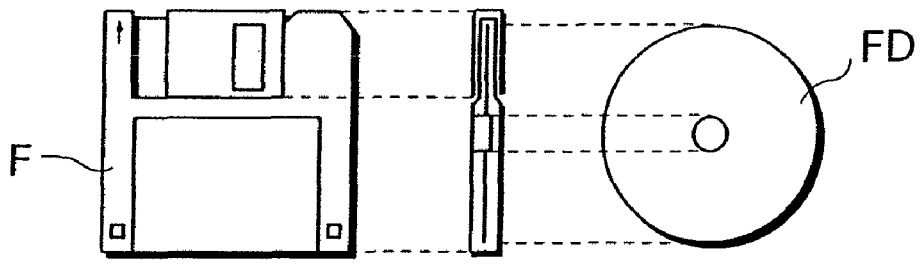
Figure 31C:
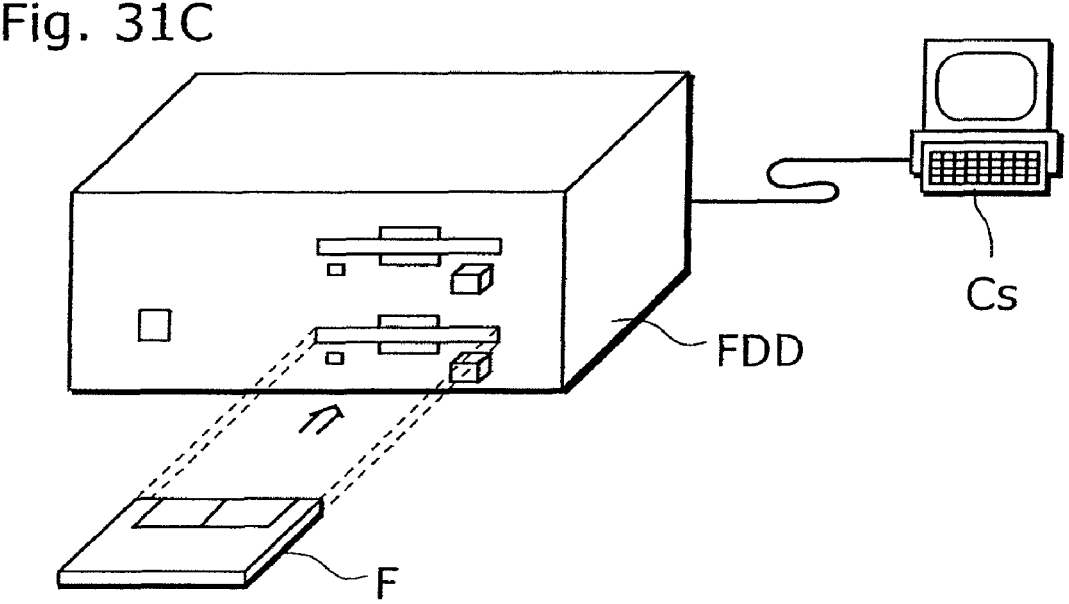
FIG. 31C is an illustration of the structure for recording and playing back the program on the flexible disc

FIG. 31C is an illustration of how the computer system executes the moving picture coding method and the moving picture decoding method of this embodiment using a program recorded in a recording medium such as a flexible disc.

FIG. 31A shows an example of a physical format of a flexible disc as a recording medium. FIG. 31B shows a flexible disc and the front view and the cross-sectional view of the appearance of the flexible disc. A flexible disc (FD) is contained in a case F, a plurality of tracks (Tr) are formed concentrically on the surface of the disc from the outer radius into the inner radius of the disc, and each track is divided into 16 sectors (Se) in the angular direction. Therefore, in the case of the flexible disc storing the above-described program, the program is recorded in an area allocated for it on the flexible disc (FD).

Also, FIG. 31C shows the structure for recording and playing back the program on the flexible disc. In the case of recoding the above program for realizing the multiplexing method and the demultiplexing method on the flexible disc FD, a computer system Cs writes the program on the flexible disc through a flexible disc drive. Also, in the case of constructing a multiplexing apparatus and a demultiplexing apparatus for realizing the multiplexing method and the demultiplexing method using the program in the flexible disc, the program is read out from the flexible disc through the flexible disc drive, and it is transmitted to the computer system.

Note that the above description has been made using a flexible disc as a recording medium, but the program can be recorded on an optical disc. Also, a recording medium is not limited to this, other recording medium such as an IC card, a ROM cassette can be used as long as it can record the program.

Up to this point, the multiplexing apparatus, the demultiplexing apparatus, the BD disc player and the like concerning the present invention have already been described based on the above-described respective embodiments, but the present invention is not limited to these embodiments. The present invention includes variations of these embodiments that a person skilled in the art would conceive as long as they are within the scope of the subject matter of the present invention.

For example, the following are included in the present invention: (i) an optical disc recording apparatus including a multiplexing apparatus in this embodiment; a moving picture sending apparatus; a digital television broadcasting apparatus; a Web server; a communication apparatus: a mobile information terminal and the like; and (ii) a moving picture receiving apparatus including a demultiplexing apparatus in this embodiment; a digital television broadcasting receiving apparatus; a communication apparatus; a mobile information terminal and the like.

Note that the respective functional blocks of the block diagrams (FIG. 14, FIG. 17, FIG. 21 and the like) are typically realized as a Large Scale Integration (LSI) that is an integrated circuit. Each of them may be made into a chip. Also, one, some or all of them may be integrated into a chip (For example, functional blocks other than a memory may be integrated into a chip.).

Here, the circuit is called LSI, but it may be called Integrated Circuit (IC), system LSI, super LSI or ultra LSI depending on the degree of integration.

Also, making method of an integration circuit is not limited to this, an exclusive circuit or a general processor may be realized. Also, it is possible to use a Field Programmable Gate Array (FPGA) that is programmable after making an LSI or a reconfigurable processor that is capable of reconfiguring the connection or settings of the circuit cell inside the LSI.

Further, when a making method of an integrated circuit that replaces an LSI is conceived resulting from the development of semiconductor technique or the emergence of a derivative technique, functional blocks may be integrated using such a technique as a matter of course. Adaptation of bio technique or the like is likely.

Also, among the respective functional blocks, only the mean for storing data to be coded or recoded may be configured separately without being integrated into a chip.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The multiplexing method and the demultiplexing method of the present invention can be applied for general apparatuses that have a special playback function such as multi-angle playback and digest playback, and thus they are especially effective in the playback of package media in which an MPEG-4 AVC coded stream is multiplexed.

The invention claimed is:

1. A multiplexing apparatus for multiplexing coded streams with other information, the coded streams including coded pictures on a per randomly-accessible access unit basis, said multiplexing apparatus comprising:
   a first determining unit configured to determine delay amounts in two access units to be decoded sequentially, which are a first access unit and a second access unit, in the coded streams such that the delay amounts in the two access units become equal to each other in the case where the two access units are access units each having a different angle and are decoded sequentially changing angles from an angle of the first access unit which is a switching source to an angle of the second access unit which is a switching destination or in the case where the two access units are access units each having a same angle and are decoded sequentially, the delay amounts each being a time lag from a decoding time of a top picture in decoding order to a display time of a top picture in display order;
   a generating unit configured to code the pictures to be included in the two access units and generate the coded streams according to the delay amounts determined by said first determining unit; and
   a multiplexing unit configured to multiplex the coded streams generated by said generating unit and the other information,
   wherein the other information includes a flag indicating whether or not the two access units can be connected to each other seamlessly, and the flag is determined depending on whether or not the delay amounts in the two access units are equal to each other.

2. A playback apparatus which demultiplexes the multiplexed data generated by the multiplexing apparatus according to claim 1 and displays the demultiplexed data, said playback apparatus comprising:
   a flag demultiplexing unit configured to demultiplex, from the multiplexed data, the flag in the case where the two access units are the access units each having the different angle and are decoded sequentially changing angles from the angle of the first access unit which is the switching source to the angle of the second access unit which is the switching destination or in the case where the two access units are the access units each having the same angle and are decoded sequentially;
   a second determining unit configured to determine the delay amount in a top access unit at a display starting time in the case where the flag demultiplexed by said flag demultiplexing unit indicates that the two access units can be connected to each other seamlessly; and
   a display unit configured to sequentially decode the two access units each having the different angle changing angles from the angle of the first access unit to the angle of the second access unit or sequentially decode the two access units each having the same angle, according to the delay amount determined by said second determining unit, and display the decoded two access units.

3. A multiplexing method for multiplexing coded streams with other information, the coded streams including coded pictures on a per randomly-accessible access unit basis, said multiplexing method comprising:
   determining delay amounts in two access units to be decoded sequentially, which are a first access unit and a second access unit, in the coded streams such that the delay amounts in the two access units become equal to each other in the case where the two access units are access units each having a different angle and are decoded sequentially changing angles from an angle of the first access unit which is a switching source to an angle of the second access unit which is a switching destination or in the case where the two access units are access units each having a same angle and are decoded sequentially, the delay amounts each being a time lag from a decoding time of a top picture in decoding order to a display time of a top picture in display order;
   coding the pictures to be included in the two access units and generating the coded streams according to the delay amounts determined in said determining; and
   multiplexing the coded streams generated in said generating and the other information,
   wherein the other information includes a flag indicating whether or not the two access units can be connected to each other seamlessly, and the flag is determined depending on whether or not the delay amounts in the two access units are equal to each other.

4. A playback method for demultiplexing the multiplexed data generated using the multiplexing method according to claim 3, said playback method comprising:
   demultiplexing the flag from the multiplexed data in the case where the two access units are the access units each having the different angle and are decoded sequentially changing angles from the angle of the first access unit which is the switching source to the angle of the second access unit which is the switching destination or in the case where the two access units are the access units each having the same angle and are decoded sequentially, the multiplexed data including (i) coded streams including coded pictures on a per randomly-accessible access unit basis and (ii) other information including the flag;
   determining a delay amount in a top access unit at a display starting time in the case where the flag demultiplexed in said demultiplexing indicates that the two access units can be connected to each other seamlessly; and
   sequentially decoding the two access units each having the different angle changing angles from the angle of the first access unit to the angle of the second access unit or sequentially decoding the two access units each having the same angle, according to the delay amount determined in said determining, and displaying the decoded two access units.

5. A recording method for recording, onto a recording medium, multiplexed data including coded streams and other information, the coded streams including coded pictures on a per randomly-accessible access unit basis, said recording method comprising:
   determining delay amounts in two access units to be decoded sequentially, which are a first access unit and a second access unit, in the coded streams such that the delay amounts in the two access units become equal to each other in the case where the two access units are access units each having a different angle and are decoded sequentially changing angles from an angle of the first access unit which is a switching source to an angle of the second access unit which is a switching destination or in the case where the two access units are access units each having a same angle and are decoded sequentially, the delay amounts each being a time lag from a decoding time of a top picture in decoding order to a display time of a top picture in display order;

coding the pictures to be included in the two access units and generating the coded streams according to the delay amounts determined in said determining;

multiplexing the coded streams generated in said generating and the other information; and recording the multiplexed data multiplexed in said multiplexing onto a recording medium, wherein the other information includes a flag indicating whether or not the two access units can be connected to each other seamlessly, and the flag is determined depending on whether or not the delay amounts in the two access units are equal to each other.

6. A playback system comprising:

a recording medium on which multiplexed data including coded streams and other information are recorded, the coded streams including coded pictures on a per randomly-accessible access unit basis; and a playback apparatus configured to read the multiplexed data from the recording medium, demultiplex the multiplexed data, and display the demultiplexed data, wherein the multiplexed data includes (i) coded streams including two access units including coded pictures and (ii) other information including a flag indicating whether or not the two access units can be connected to each other seamlessly such that the delay amounts in the two access units become equal to each other in the case where the two access units are access units each having a different angle and are decoded sequentially changing angles from an angle of the first access unit which is a switching source to an angle of the second access unit which is a switching destination or in the case where the two access units are access units each having a same angle and are decoded sequentially, the delay amounts each being a time lag from a decoding time of a top picture in decoding order to a display time of a top picture in display order, and wherein said playback apparatus includes:

a flag demultiplexing unit configured to demultiplex the flag from the multiplexed data;

a determining unit configured to determine the delay amount in a top access unit at a display starting time in the case where the flag demultiplexed by said flag demultiplexing unit indicates that the two access units can be connected to each other seamlessly; and a display unit configured to sequentially decode the two access units each having the different angle changing angles from the angle of the first access unit to the angle of the second access unit or sequentially decode the two access units each having the same angle, according to the delay amount determined by said determining unit, and display the decoded two access units.

7. A non-transitory computer-readable recording medium on which multiplexed data including coded streams and other information are recorded, the coded streams including coded pictures on a per randomly-accessible access unit basis, wherein the multiplexed data includes (i) coded streams including two access units including coded pictures and (ii) other information including a flag indicating whether or not the two access units can be connected to each other seamlessly such that the delay amounts in the two access units become equal to each other in the case where the two access units are access units each having a different angle and are decoded sequentially changing angles from an angle of the first access unit which is a switching source to an angle of the second access unit which is a switching destination or in the case where the two access units are access units each having a same angle and are decoded sequentially, the delay amounts each being a time lag from a decoding time of a top picture in decoding order to a display time of a top picture in display order.

* * * * *